(12) United States Patent
Watanabe

(10) Patent No.: US 9,963,909 B2
(45) Date of Patent: May 8, 2018

(54) ELECTRONIC KEY FOR VEHICLE

(71) Applicant: DENSO CORPORATION, Kariya, Aichi-pref. (JP)

(72) Inventor: Shinji Watanabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/562,147

(22) PCT Filed: Mar. 17, 2016

(86) PCT No.: PCT/JP2016/001535
§ 371 (c)(1),
(2) Date: Sep. 27, 2017

(87) PCT Pub. No.: WO2016/157792
PCT Pub. Date: Oct. 6, 2016

(65) Prior Publication Data
US 2018/0080249 A1    Mar. 22, 2018

(30) Foreign Application Priority Data

Mar. 30, 2015 (JP) ................................ 2015-069204

(51) Int. Cl.
| | |
|---|---|
| *A47G 29/10* | (2006.01) |
| *E05B 19/00* | (2006.01) |
| *B60R 25/24* | (2013.01) |
| *E05B 19/04* | (2006.01) |

(52) U.S. Cl.
CPC .......... *E05B 19/0082* (2013.01); *B60R 25/24* (2013.01); *E05B 19/046* (2013.01)

(58) Field of Classification Search
CPC .... E05B 19/0082; E05B 19/046; E05B 19/14; B60R 25/24; G07C 9/00952
USPC .............. 70/395–401, 257, 408, 456 R, 459; 206/37.1–37.8, 38.1
See application file for complete search history.

(56) References Cited

U.S. PATENT DOCUMENTS

| | | | | |
|---|---|---|---|---|
| 3,457,746 | A * | 7/1969 | Glassman | ............ A45C 11/328 70/408 |
| 3,672,192 | A * | 6/1972 | Dontas | ................. A45C 11/328 70/414 |
| 6,474,123 | B1 * | 11/2002 | Kito | ...................... E05B 19/046 206/37.2 |
| 2003/0000267 | A1 | 1/2003 | Jacob et al. | |

(Continued)

FOREIGN PATENT DOCUMENTS

JP        2012046931 A        3/2012

*Primary Examiner* — Lloyd A Gall
(74) *Attorney, Agent, or Firm* — Harness, Dickey & Pierce, P.L.C.

(57) ABSTRACT

An electronic key for a vehicle includes an upper case component of a key case, a lower case component attachable to the upper case component, and a mechanical key that is selected from among a first mechanical key that is used in a state of being totally removed from the key case and a second mechanical key that is used in a protruding state of partially protruding from the key case. The lower case component is selected, so as to correspond to the mechanical key, from among a first lower case component that accommodates the first mechanical key to be removable and a second lower case component that accommodates the second mechanical key to be movable into the protruding state.

7 Claims, 26 Drawing Sheets

(56) References Cited

U.S. PATENT DOCUMENTS

| | | | |
|---|---|---|---|
| 2006/0150696 A1* | 7/2006 | Eychenne | A45C 11/325 |
| | | | 70/456 R |
| 2008/0229794 A1* | 9/2008 | Fujimoto | E05B 19/0082 |
| | | | 70/456 R |
| 2011/0084856 A1* | 4/2011 | Kleindienst | E05B 19/043 |
| | | | 340/990 |
| 2012/0272698 A1* | 11/2012 | Gschweng | E05B 19/043 |
| | | | 70/396 |
| 2015/0204108 A1* | 7/2015 | Ghabra | E05B 19/0082 |
| | | | 70/456 R |
| 2015/0257503 A1* | 9/2015 | Packer | A45C 13/023 |
| | | | 701/2 |

* cited by examiner

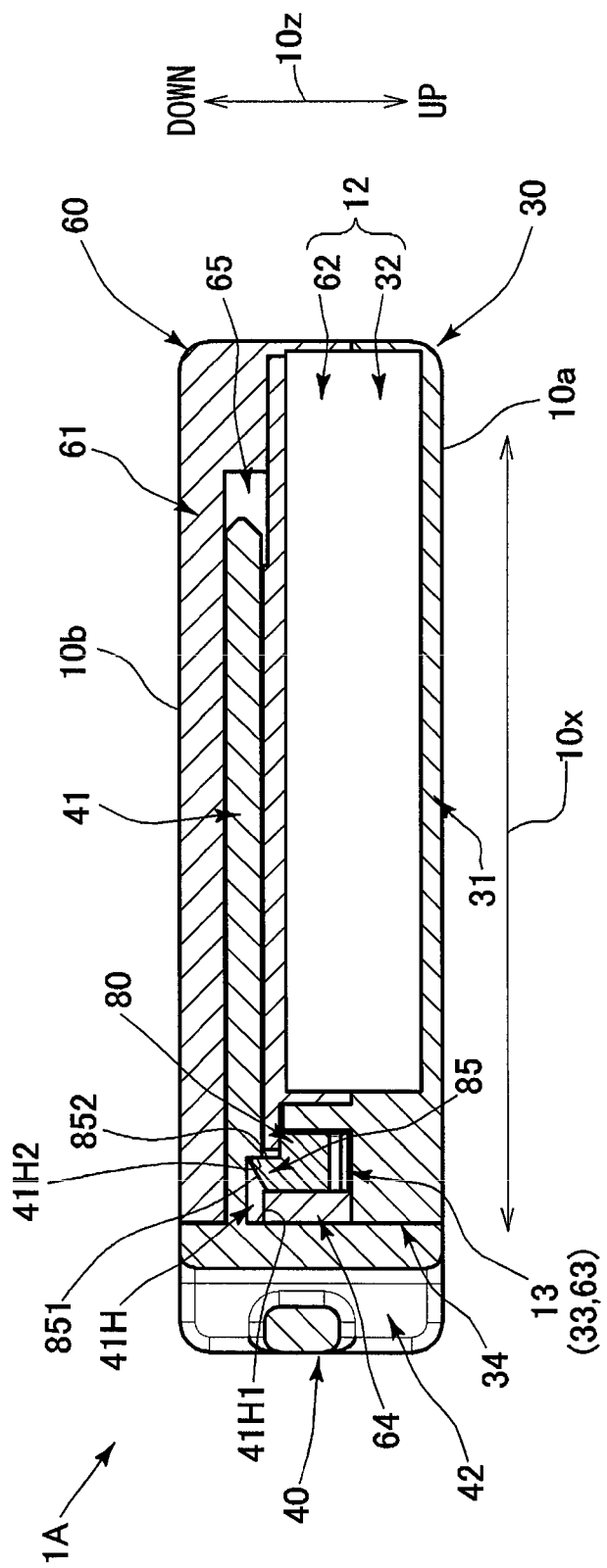

ELECTRONIC KEY FOR VEHICLE

CROSS REFERENCE TO RELATED APPLICATIONS

This application is a U.S. National Phase Application under 35 U.S.C. 371 of International Application No. PCT/JP2016/001535 filed on Mar. 17, 2016 and published in Japanese as WO 2016/157792 A1 on Oct. 6, 2016. This application is based on and claims the benefit of priority from Japanese Patent Application No. 2015-069204 filed on Mar. 30, 2015. The entire disclosures of all of the above applications are incorporated herein by reference.

TECHNICAL FIELD

The present disclosure relates to a vehicle electronic key which is capable of performing a wireless communication with a vehicle and houses a mechanical key therein.

BACKGROUND ART

The vehicle electronic key makes it possible to unlock a door and start an engine by being verified by a wireless communication with a vehicle (refer to Patent Literature 1). Since such a vehicle electronic key is driven by a power supply such as a battery, the vehicle electronic key cannot be used when the battery runs out, but in consideration of this point, a mechanical key is contained inside of the vehicle electronic key.

The mechanical key is different in frequency of use depending on users. In other words, there are users who do not use the mechanical key much and mainly use the wireless communication, and users who do not use the wireless communication much and mainly use the mechanical key. An optimum design of the key is different depending on the two types of the users. For example, the users who mainly use the wireless communication desire a design that reliably accommodates the mechanical key. On the other hand, the users who mainly use the mechanical key emphasize ease of taking out the mechanical key.

However, it is difficult to realize the design of the vehicle electronic key that satisfies both of those requirements, and it is sometimes necessary to separately prepare each key. For that reason, two or more keys different in design exist to one vehicle, which may increase the waste of cost.

PRIOR ART LITERATURE

Patent Literature

Patent Literature 1: JP 2012-46931 A

SUMMARY

It is an object of the present disclosure to provide at low cost a vehicle electronic key having a design capable of satisfying demands of both a user who mainly uses a wireless communication and a user who mainly uses a mechanical key.

According to an aspect of the present disclosure, a vehicle electronic key includes a wireless communication function component that is accommodated in a key case and performs a wireless communication with a corresponding vehicle, an upper case component that forms an upper side of the key case, a mechanical key that is one selected from two: a first mechanical key that is used in a state of being wholly removed from the key case; and a second mechanical key that is used in a protruding state of partially protruding from the key case, and a lower case component that is one selected from among a first lower case component and a second lower case component so as to correspond to the mechanical key, the first lower case component accommodating the first mechanical key to be removable from the key case, the second lower case component accommodating the second mechanical key to be movable into the protruding state, both the first lower case component and the second lower case component being attachable to the upper case component.

According to one aspect of the present disclosure, with the configuration in which the mechanical key is accommodated in the lower case component, two types of vehicle electronic keys different in usage state can be assembled while the upper case component and the wireless communication function component are common parts, and the mechanical key and the lower case component are individual parts. This not only satisfies the desires of both the user who mainly uses the wireless communication and the user who mainly uses the mechanical key but also reduces the costs from the viewpoint that there are many parts common to the two types of vehicle electronic keys.

According to another aspect of the present disclosure, a vehicle electronic key includes a key case that includes an upper case component and a lower case component attachable to the upper case component, a wireless communication function component that is housed in the key case and performs a wireless communication with a corresponding vehicle, and a mechanical key that is housed in the lower case component and capable of being inserted into a keyhole of the vehicle. The mechanical key is one of a first mechanical key that is to be inserted into the keyhole of the vehicle in a state of being wholly removed from the lower case component and a second mechanical key that is to be inserted into the keyhole of the vehicle in a state of partially protruding from the lower case component. The lower case component is one of a first lower case component and a second lower case component so as to correspond to the mechanical key, the first lower case component accommodating the first mechanical key to be removable from the key case, the second lower case component accommodating the second mechanical key to be capable of partially protruding.

BRIEF DESCRIPTION OF THE DRAWINGS

FIG. 5B is a cross-sectional view taken along a line VB-VB in FIG. 4.

DESCRIPTION OF EMBODIMENTS

Hereinafter, an embodiment of the present disclosure will be described with reference to the drawings.

Figure 1:
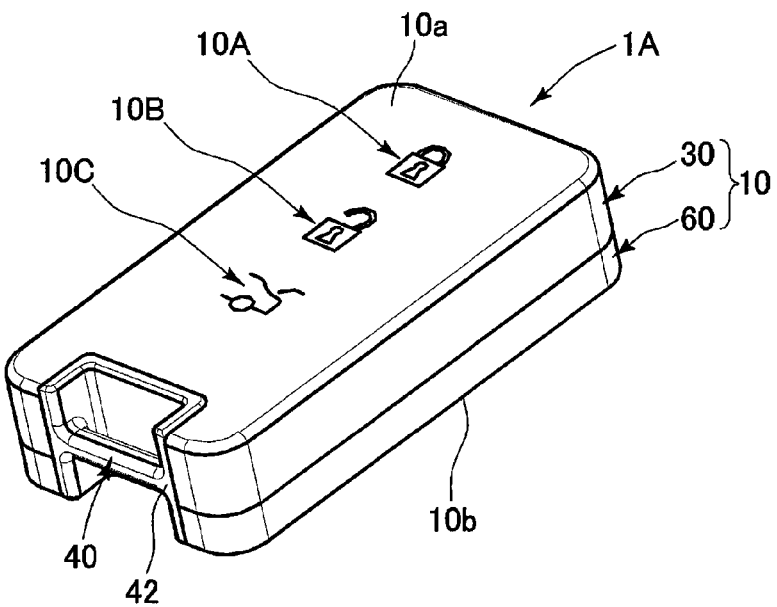
FIG. 1 is a perspective view showing a first vehicle electronic key capable of being assembled, according to an embodiment of the present disclosure.
Figure 13:
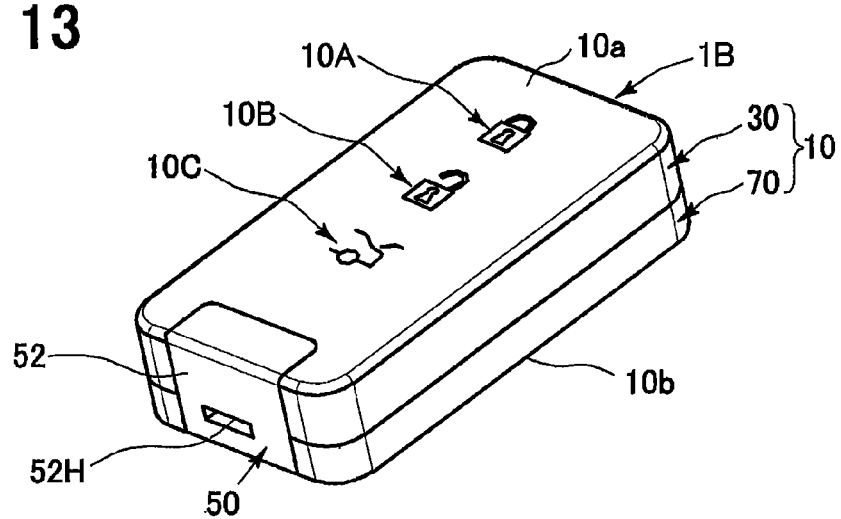
FIG. 13 is a perspective view showing a second vehicle electronic key capable of being assembled, according to the embodiment of the present disclosure.

As shown in FIGS. 1 and 13, vehicle electronic keys 1A and 1B according to the present disclosure are capable of performing a wireless communication with a corresponding vehicle not shown, and also are capable of accommodating any one of a first mechanical key 40 (refer to FIG. 2) and a second mechanical key 50 (refer to FIGS. 14A and 14B) inside of a key case 10. The mechanical keys 40 and 50 can unlock a door by being inserted into a keyhole of the door of the corresponding vehicle and performing a predetermined unlocking operation (in this case, rotating operation).

In the vehicle electronic keys 1A and 1B according to the present embodiment, when entering a reception area of a search signal wirelessly transmitted from the vehicle (not shown) and receiving the search signal, a verification bidirectional wireless communication with the vehicle is started, and verification process for verifying the vehicle electronic keys 1A and 1B is executed in the vehicle. As a result of the verification process, if the verification is acceptable, execution of a predetermined vehicle control in the vehicle is permitted whereas if the verification is unacceptable, the execution of the vehicle control is prohibited.

The vehicle control described above is unlocking of the door of the vehicle and an engine starting of the vehicle in the present embodiment. The bidirectional wireless communication for verification is executed in such a manner that an area surrounding the vehicle door outside the vehicle is set as the reception area in the case of unlocking the door of the vehicle, and an entire vehicle interior is set as the reception area in the case of engine startup.

As shown in FIGS. 1 and 13, the vehicle electronic keys 1A and 1B according to the present embodiment are provided with operation portions 10 A, 10B, and 10C on a first main surface 10a of the key case 10. When a user performs a predetermined operation (in this case, a push operation) on the operation portions 10A, 10B, and 10C, the vehicle electronic keys 1A and 1B wirelessly transmit corresponding control commands to the vehicle, and cause the vehicle to execute corresponding vehicle controls. In this example, the operation portion 10A executes the locking of the vehicle door, the operation portion 10B executes the unlocking of the vehicle door, and the operation portion 10C executes the opening operation of a trunk of the vehicle.

Figure 2:
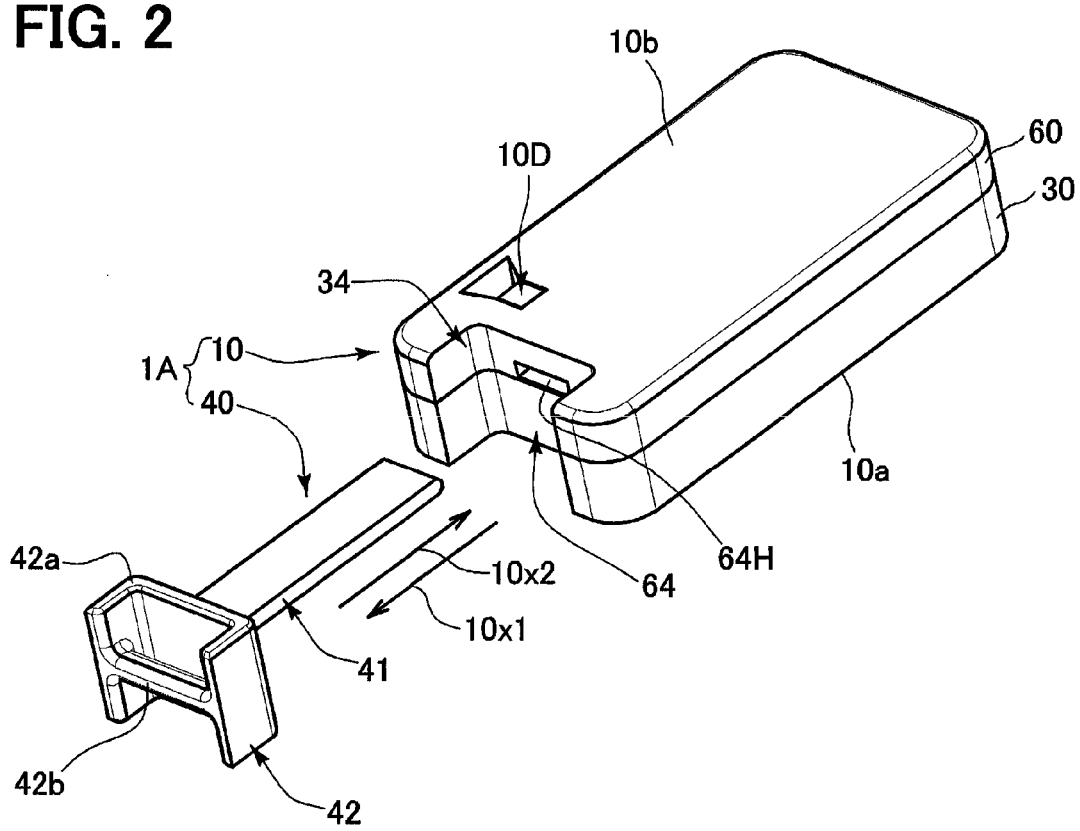
FIG. 2 is a perspective view showing a state in which a mechanical key of the vehicle electronic key of FIG. 1 is taken out.
Figure 14A:
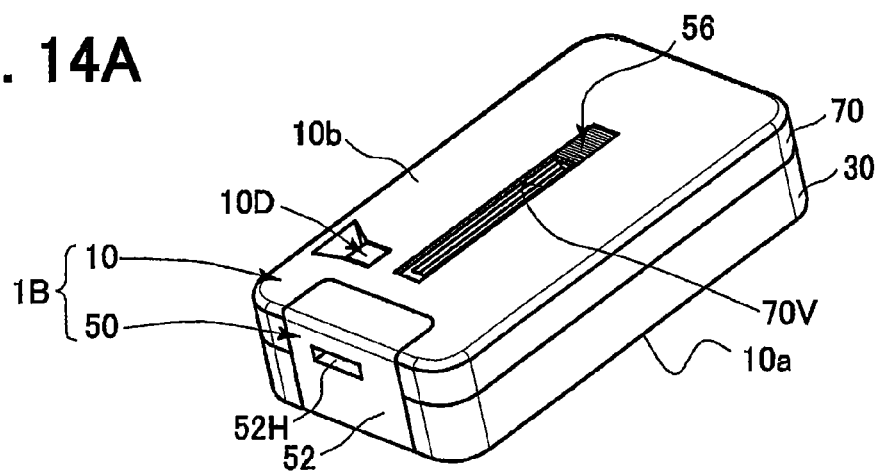
FIG. 14A is a perspective view showing the accommodated state of the mechanical key of the vehicle electronic key in FIG. 13.

As shown in FIGS. 2 and 14A, the vehicle electronic keys 1A and 1B according to the present embodiment are provided with an operation portion 10D on a second main surface 10b on a rear side of the first main surface 10a of the key case 10. The operation portion 10D according to the present embodiment is configured to have a first or second switching operation component 80, 90 to be described later and an urging member (in this example, a spring member) 19. When the user performs a predetermined operation (in this case, a push operation: a state switching operation to be described later) on the operation portion 10D, a movement restriction to which the mechanical keys 40 and 50 accommodated in the vehicle electronic keys 1A and 1B are subjected at a predetermined position can be canceled.

In other words, the mechanical key 40 of the vehicle electronic key 1A according to the present embodiment is restricted from moving in a takeout direction 10x1 (refer to FIG. 2) in an accommodated state of FIG. 1 accommodated in the key case 10. The movement restriction is canceled by an operation on the operation portion 10D. On the other hand, the mechanical key 50 of the vehicle electronic key 1B is restricted from moving in the takeout direction 10x1 (refer to FIG. 14B) in the accommodated state of FIG. 14A accommodated in the key case 10. Furthermore, the mechanical key 50 of the vehicle electronic key 1B is restricted from moving in an insertion direction 10x2 opposite to the takeout direction 10x1 in a protruding state of FIG. 14B in which a part of the mechanical key 50 is protruded to an outside of the key case 10. The respective movement restrictions in the accommodated state and protruding state can be canceled by the operation on the operation portion 10D.

Now, the vehicle electronic keys 1A and 1B according to the present embodiment will be described in more detail with reference to the drawings.

Figure 3:
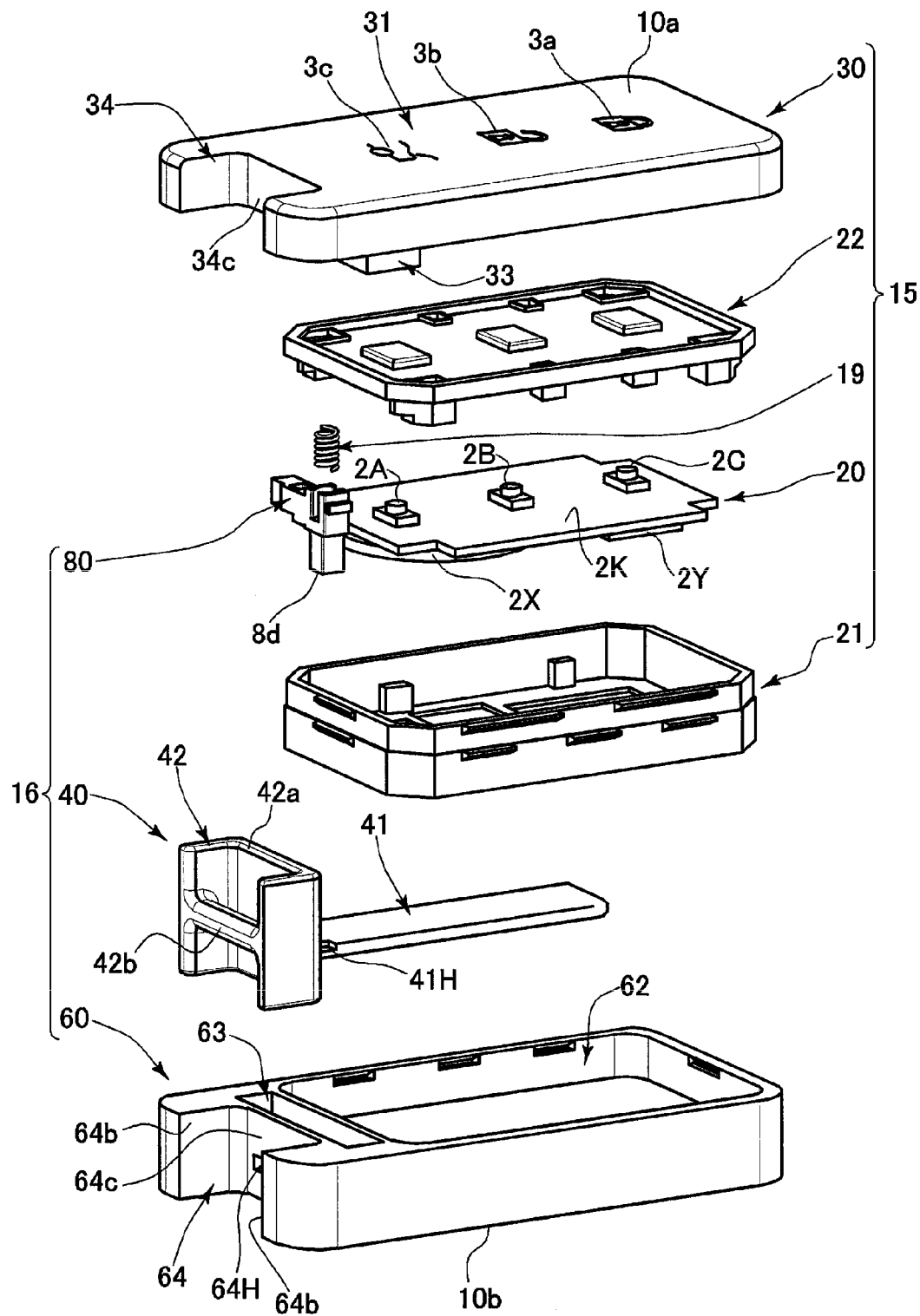
FIG. 3 is an exploded perspective view of the vehicle electronic key of FIG. 1.
Figure 15:
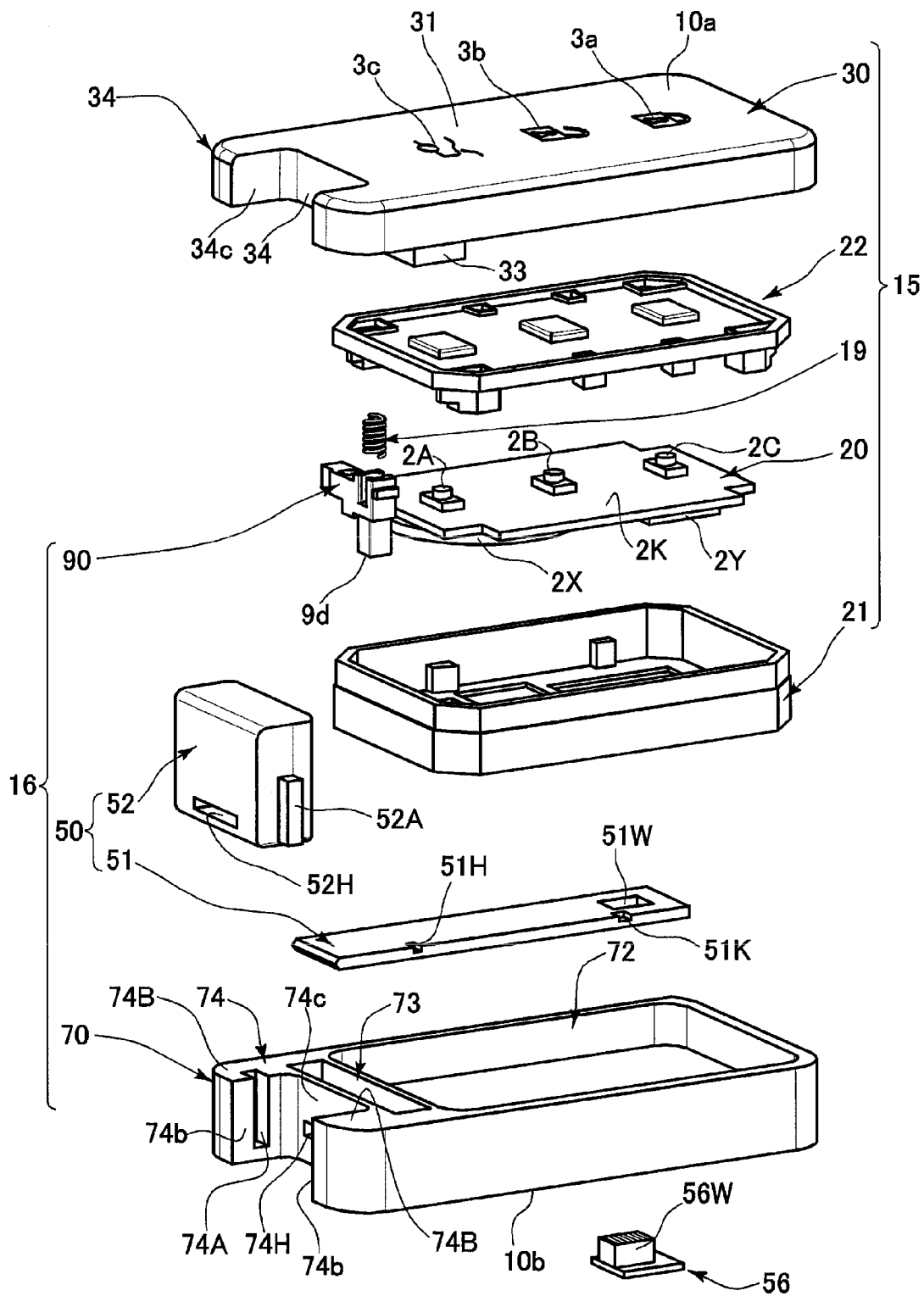
FIG. 15 is an exploded perspective view of the vehicle electronic key of FIG. 13.

As shown in FIGS. 3 and 15, the vehicle electronic keys 1A and 1B according to the present embodiment are assembled together with the use of parts selected from a group of vehicle electronic key parts including a wireless communication function component 20, an upper case component 30, a first mechanical key 40, a first lower case component 60, a second mechanical key 50, and a first lower case component 70. The wireless communication function component 20 is a part that is accommodated in the key case 10 for performing a wireless communication with the corresponding vehicle. The upper case component 30 is a part that forms an upper side of the key case 10. The first mechanical key 40 is a key which is entirely removed from the key case 10 in use. The first lower case component 60 is a part that forms a lower side of the key case 10 and accommodates the first mechanical key 40 to be removable. The second mechanical key 50 is a key used in a protruding state in which a part of the second mechanical key 50 protrudes from the key case 10. The second lower case component 70 is a part that forms the lower side of the key case 10 and accommodates the second mechanical key 50 so as to be shifted to the protruding state.

In other words, in the present embodiment, two types of vehicle electronic keys 1A and 1B can be assembled by selecting the parts from the vehicle electronic key parts group described above. One of the two types of vehicle electronic keys 1A and 1B become the other type of vehicle electronic keys 1B and 1A by replacing corresponding parts among the selective components 16 described later with each other.

As shown in FIG. 3, the first vehicle electronic key 1A is assembled with the use of the wireless communication function component 20 and the upper case component 30 forming common components 15, and the first mechanical key 40 and the first lower case component 60 forming selective components 16. The first vehicle electronic key 1A is a key of the type in which the mechanical key 40 accommodated inside is removed from the key case 10 in use.

On the other hand, as shown in FIG. 15, the second vehicle electronic key 1B is assembled with the use of the wireless communication function component 20 and the upper case component 30 forming common components 15, and the second mechanical key 50 and the second lower case component 70 forming the selective components 16. The second vehicle electronic key 1B cannot remove the mechanical key 50 accommodated inside from the key case 10 but allows the key body 51 accommodated inside the key case 10 to put in a protruding state of being protruded to the outside. The second vehicle electronic key 1B is a key of the type used in the protruding state.

As shown in FIG. 3, the first mechanical key 40 according to the present embodiment is shaped to integrate a shaft-shaped key shaft portion 41 to be inserted into a keyhole of the vehicle and a key head portion 42 serving as a handle for insertion into the keyhole together. On the other hand, as shown in FIG. 15, the second mechanical key 50 according to the present embodiment separately includes a shaft-shaped key body 51 to be inserted into the keyhole of the vehicle, and a key passing portion 52 provided with an opening 52H that lets the key body 51 protrude to the outside in a state of extending therethrough.

Figure 5A:
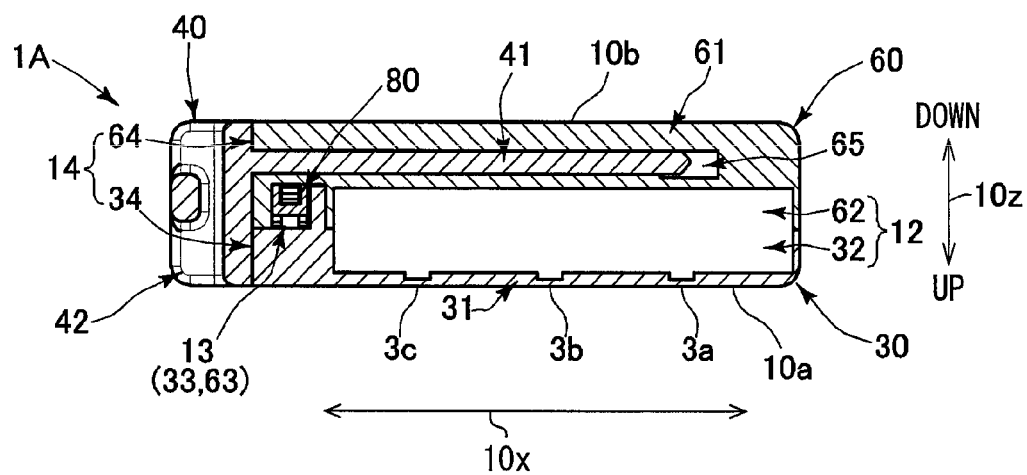
FIG. 5A is a cross-sectional view taken along a line VA-VA in FIG. 4.
Figure 8:
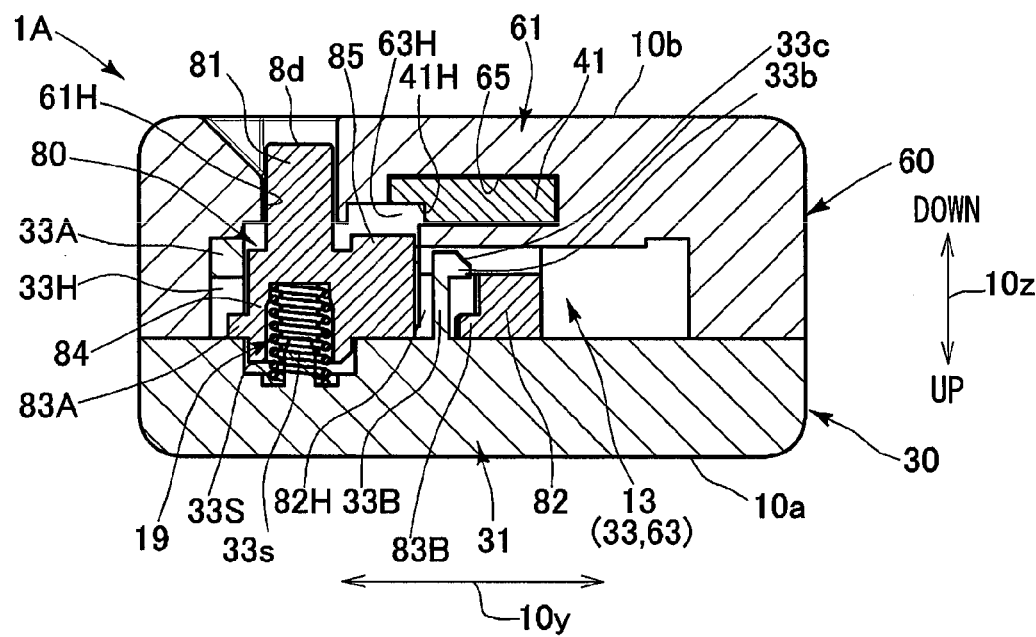
FIG. 8 is a cross-sectional view showing a state in which a user's operation of pushing down a switching operation component is performed and a movement restriction of the mechanical key is released in FIG. 5C.
Figure 9:
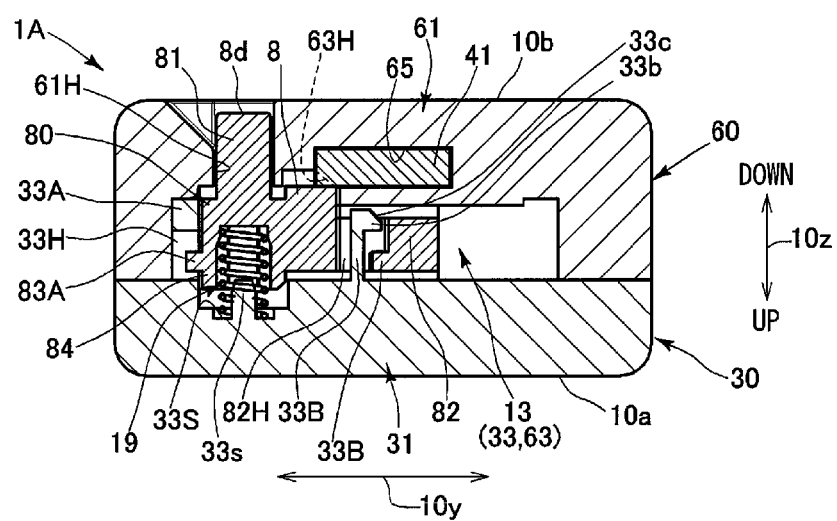
FIG. 9 is a cross-sectional view showing a state in which the mechanical key is moving in FIG. 5C.
Figure 19A:
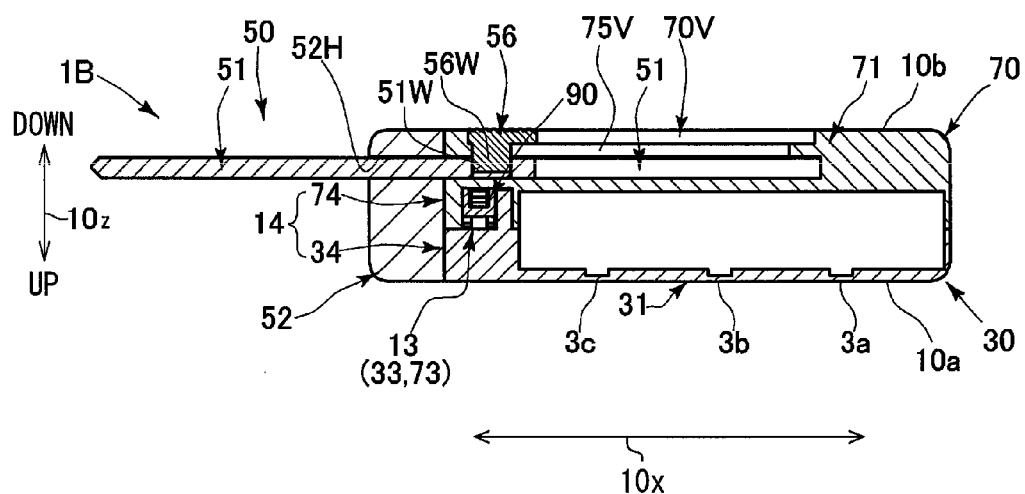
FIG. 19A is a cross-sectional view taken along a line XIXA-XIXA in FIG. 18.
Figure 21A:
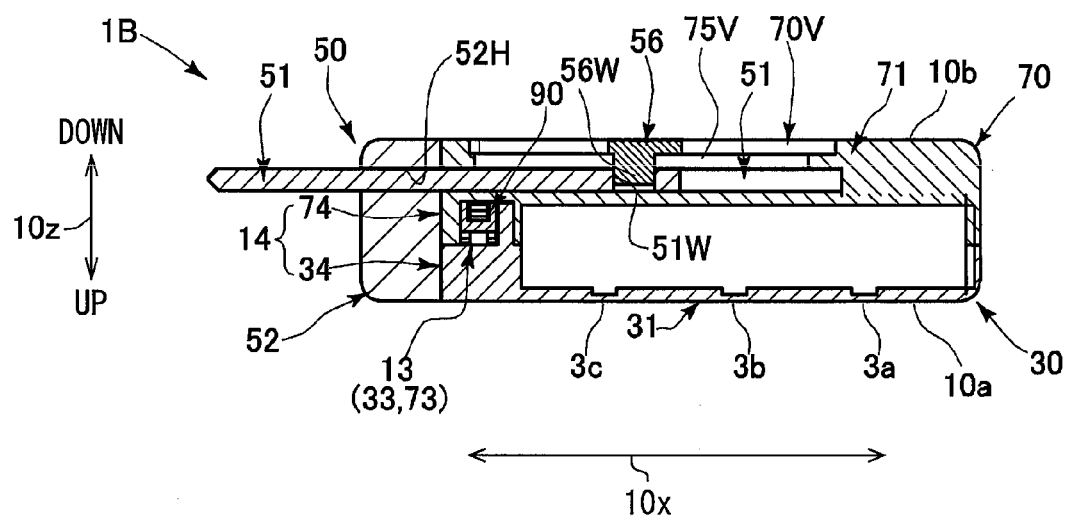
FIG. 21A is a cross-sectional view taken along a line XXIA-XXIA in FIG. 20.
Figure 21B:
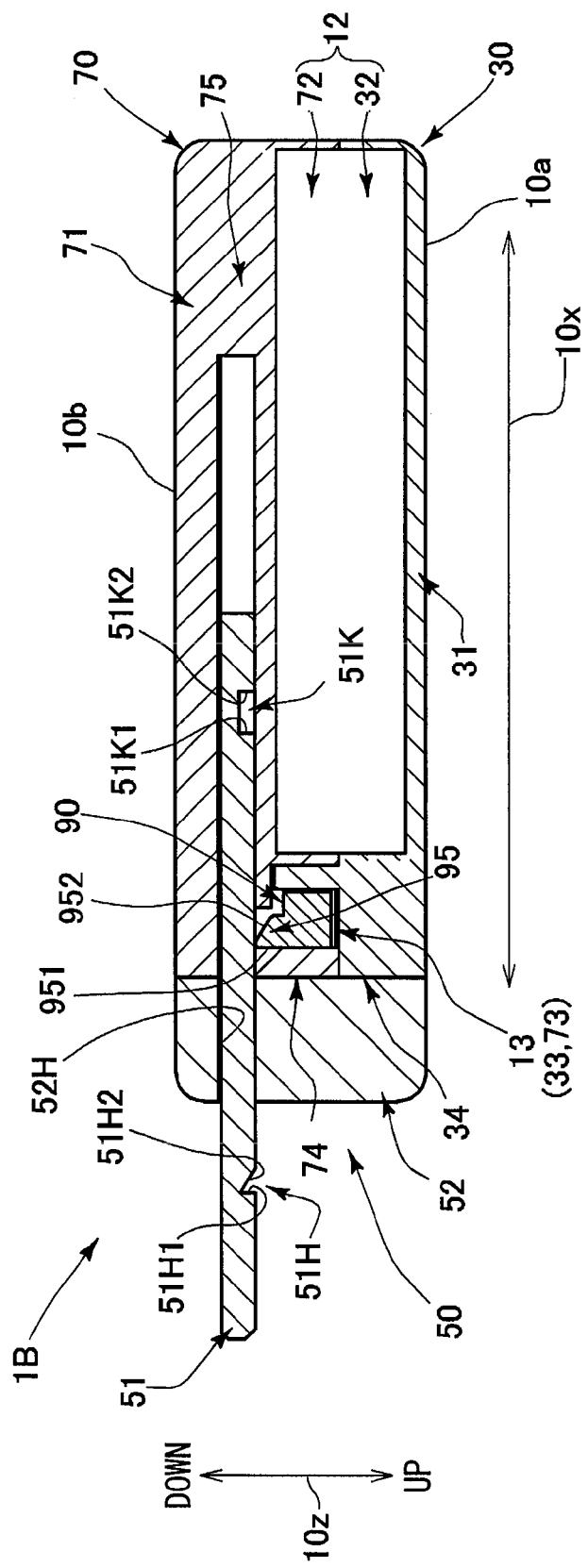
FIG. 21B is a cross-sectional view taken along a line XXIB-XXIB in FIG. 20.
Figure 21C:
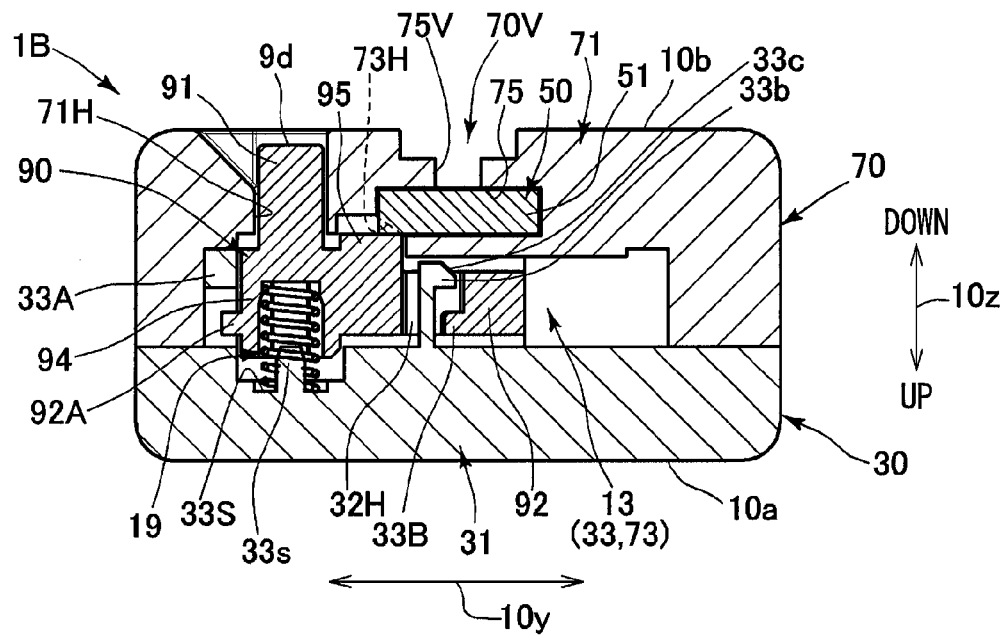
FIG. 21C is a cross-sectional view taken along a line XXIC-XXIC in FIG. 20.

Furthermore, in the present embodiment, the selective components 16 of the vehicle electronic key part group include a first switching operation component 80 (refer to FIG. 3) attached to the first vehicle electronic key 1A, and a second switching operation component 90 (refer to FIG. 15) attached to the second vehicle electronic key 1B. The first switching operation component 80 is a part that switches between a movement restriction state (locked state: refer to FIGS. 5A to 5C) in which the first mechanical key 40 is held in a state of being accommodated in the first lower case component 60, and a movable state (unlocked state: refer to FIG. 8) in which removal from the movable restriction state is permitted and the first mechanical key 50 becomes removable, based on a predetermined state switching operation by the user. On the other hand, the second switching operation component 90 is a part that switches among a movement restriction state (locked state: refer to FIGS. 17A to 17C) in which the second mechanical key 50 is held in a state of being accommodated in the second lower case component 70, a movement restriction state (locked state: refer to FIGS. 19A to 19C) in which the second mechanical key 50 is held in the protruding state, and a movable state (unlocked state: refer to FIGS. 21A to 21C) in which the movement restriction is unlocked from the movement restriction states and a reciprocating motion is enabled between both of those states, based on a predetermined state switching operation by the user.

In each cross-sectional view of FIGS. 5A and 5B, FIGS. 7A and 7B, FIGS. 8 and 9, FIGS. 17A and 17B, FIGS. 19A and 19B, and FIGS. 21A and 21B, the wireless communication function components 20, 21, and 22 accommodated inside the key case 10 are omitted.

As shown in FIGS. 5A to 5C and FIGS. 17A to 17 C, the upper case component 30 includes an upper surface portion 31, a component accommodation portion (communication component accommodation portion) 32, a component accommodation portion (operation component accommodation portion) 33, and a key fitting portion 34. The upper surface portion 31 forms a first main surface 10$a$ having a maximum area in the rectangular parallelepiped key case 10. The component accommodation portion 32 is formed under the upper surface portion 31, and accommodates the wireless communication function components 20, 21, and 22 (refer to FIGS. 3 and 15) from below. The component accommodation portion 33 is formed on a lower side of the upper surface portion 31 and accommodates one of the first switching operation component 80 and the second switching operation component 90. The key fitting portion 34 is formed at a first side end portion (an end on the takeout direction 10$x$1) in a longitudinal direction 10$x$ of the rectangular first main surface 10$a$, and fitted to one of the key head portion 42 of the first mechanical key 40 and the key passing portion 52 of the second mechanical key 50.

As shown in FIGS. 5A to 5C and FIGS. 17A to 17C, the lower case components 60 and 70 include lower surface portions 61 and 71, part storage portions 62 and 72 (first communication component accommodation portion 62 and second communication component accommodation portion 72), component accommodation portions 63 and 73 (first operation component accommodation portion 63 and second operation component accommodation portion 73), key fitting portions 64 and 74, and key accommodation portions 65 and 75 (first key accommodation portion 65 and second key accommodation portion 75). The lower surface portions 61 and 71 form a second main surface 10$b$ on the rear side of the first main surface 10$a$ in the rectangular parallelepiped key case 10. The component accommodation portions 62 and 72 are formed on an upper side of the lower surface portions 61 and 71, and accommodate the wireless communication function components 20, 21, and 22 from above. As shown in FIGS. 3 and 15, the component accommodation portions 63, 73 are formed on the upper side of the lower surface portion 61 and accommodate any one of the first switching operation component 80 and the second switching operation component 90. The key fitting portions 64 and 74 are formed at the first side end portion in the longitudinal direction 10$x$ of the rectangular second main surface 10$b$, and fitted to any one of the key head portion 42 of the first mechanical key 40 and the key passing portion 52 of the second mechanical key 50. The key accommodation portions 65 and 75 accommodate one of the key shaft portion 41 of the first mechanical key 40 and the key body 51 of the second mechanical key 50.

As shown in FIGS. 5A, 5B and FIGS. 17A, 17B, the component accommodation portion 32 of the upper case component 30 is formed to be wider from a second side end portion opposite to the first side in the longitudinal direction 10$x$ toward a center in the longitudinal direction 10$x$, and has a recessed shape capable of accommodating the wireless communication function components 20, 21, and 22 from below. On the other hand, the component accommodation portions 62 and 72 of the lower case components 60 and 70 are formed to be wider from the second side end portion opposite to the first side in the longitudinal direction 10$x$ toward the center in the longitudinal direction 10$x$, and has a recessed shape capable of accommodating the wireless communication function components 20, 21, and 22 from above. When one of the lower case components 60 and 70 is attached to the upper case component 30, an accommodation space 12 for accommodating the wireless communication function components 20, 21, and 22 is formed in the key case 10 by the aid of the component accommodation portion 32 of the upper case component 30 and the component accommodation portions 62 and 72 of the lower case components 60, 70 attached to the upper case components 30.

The accommodation space 12 is an enclosed space which is defined in a non-communicating manner with the outside and other spaces in the key case 10. For that reason, the inside of the accommodation space 12 is in a dustproof and waterproof state.

It is to be noted that the component accommodation portions 62 and 72 of the first and second lower case components 60 and 70 which are the selective components 16 are formed with the same shape. For that reason, both of the component accommodation portions 62 and 72 can accommodate the wireless communication function components 20, 21, and 22 which are common components.

As shown in FIGS. 3 and 15, the wireless communication function component 20 is configured as a circuit board 2K on which various elements are mounted. The circuit board 2K according to the present embodiment is provided with function portions 2X and 2Y (transmitting and receiving unit 2X and control unit 2Y and the like in this case) for performing the wireless communication described above, operation input portions 2A, 2B, and 2C forming the operation portions 10A, 10B and 10C described above (in this case, the tact switches 2A, 2B, 2C) and the like.

Further, in the present embodiment, the wireless communication function components 21 and 22 are provided together with the wireless communication function component 20. The wireless communication function components 21 and 22 are protection parts for protecting the parts 20. The protection part 21 is a substrate container for accommodating the circuit board from an upper opening. The protection part 22 is a waterproof cover for waterproofing the interior of the substrate container 21. The protection part 22 is disposed in a state in which the circuit board 2K is accommodated in the substrate container 21 so as to close the upper opening of the substrate container 21.

Figure 10A:
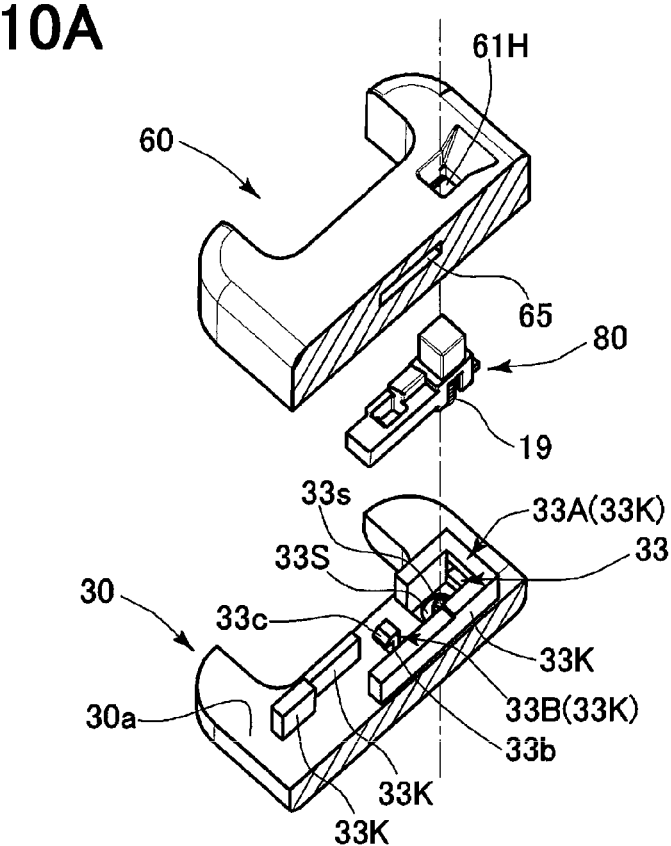
FIG. 10A is an exploded perspective view of a longitudinal first side portion of the vehicle electronic key of FIG. 1.

As shown in FIGS. 5A to 5C and FIGS. 17A to 17C, the component accommodation portion 33 of the upper case component 30 is formed between the key fitting portions 34 and 74 on the first side and the component accommodation portions 32, 62, and 72 on the second side in the longitudinal direction 10$x$, and has a shape capable of accommodating both the first switching operation component 80 and the second switching operation component 90 from below. In the present embodiment, as shown in FIG. 10A, the component accommodation portion 33 is formed by wall portions 33K extending downward from a rear surface 30$a$ opposite to the first main surface 10$a$ of the upper surface portion 31 in the upper case component 30. The switching operation components 80 and 90 are accommodated in an inside surrounded by the wall portions 33K so as to be positioned by the wall portions 33K. In addition, the switching operation components 80 and 90 are accommodated in the inside surrounded by the wall portions 33K so as to be engaged and fixed to engagement portions 33A and 33B formed as parts of the wall portions 33K.

Figure 10B:
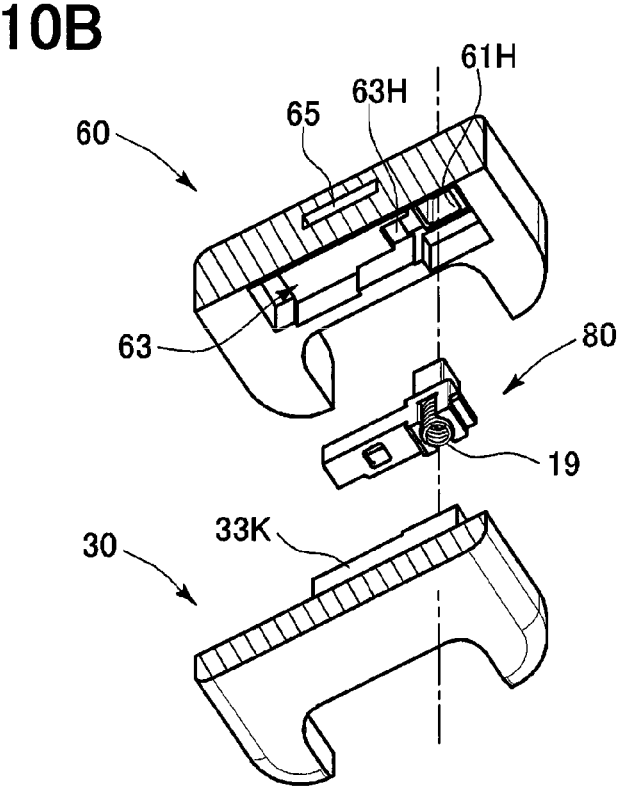
FIG. 10B is an exploded perspective view of FIG. 10A viewed from another angle.

On the other hand, as shown in FIGS. 5A to 5C and FIGS. 17A to 17C, the component accommodation portions 63 and 73 of the lower case components 60 and 70 are formed between the key fitting portions 64 and 74 on the first side and the component accommodation portions 62 and 72 on the second side in the longitudinal direction 10$x$, and have a shape capable of accommodating both the first switching operation component 80 and the second switching operation component 90 from above, respectively. In addition, as shown in FIG. 10B, the parts accommodation portions 63 and 73 according to the present embodiment have a recessed shape capable of accommodating the switching operation components 80 and 90 accommodated in the component accommodation portion 33 together with the component accommodation portion 33 of the upper case component 30 from above.

Although FIGS. 10A, 10B and FIGS. 12A to 12C illustrate the first vehicle electronic key 1A, the same is applied to the second vehicle electronic key 1B with respect to those illustrated portions. Therefore, those portions of the second vehicle electronic key 1B will be omitted from illustration.

Further, the component accommodation portions 63 and 73 of the lower case components 60 and 70 have through-holes 61H and 71H, and openings 63H and 73H, respectively. The through holes 61H and 71H penetrate through the lower surface portions 61 and 71 of the lower case components 60 and 70 in the vertical direction to communicate with the outside, respectively. The openings 63H and 73H communicate with the key accommodation portions 65 and 75, respectively.

In addition, both of the component accommodation portions 63 and 73 of the first and second lower case components 60 and 70 which are the selective components 16 are formed in the same shape.

Figure 5C:
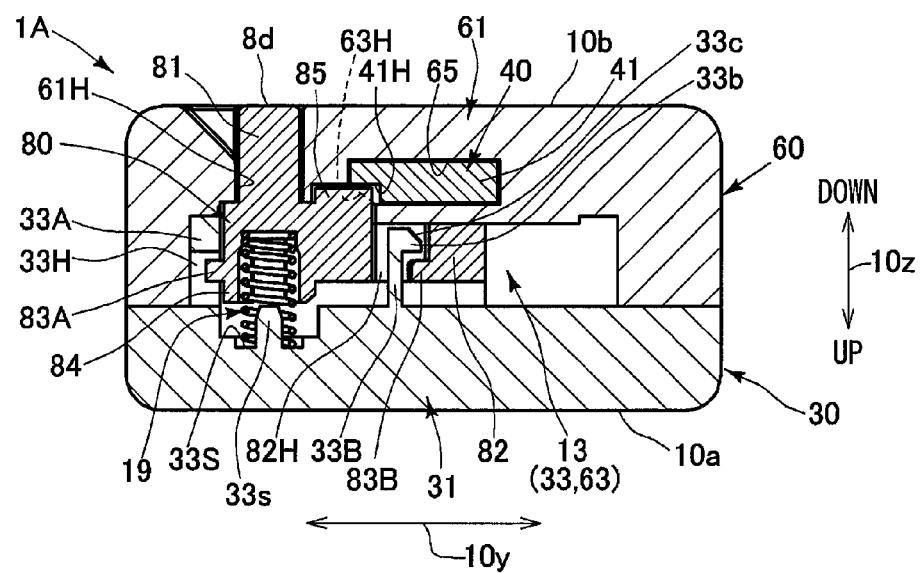
FIG. 5C is a cross-sectional view taken along a line VC-VC in FIG. 4.
Figure 6:
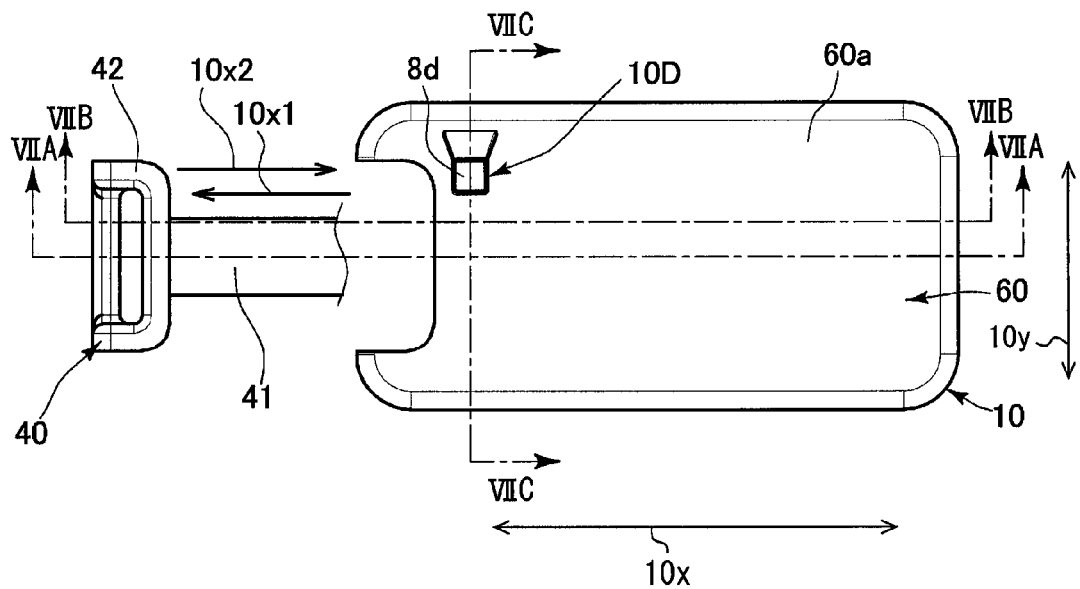
FIG. 6 is a bottom view showing a state in which the mechanical key of the vehicle electronic key in FIG. 1 is taken out.
Figure 7A:
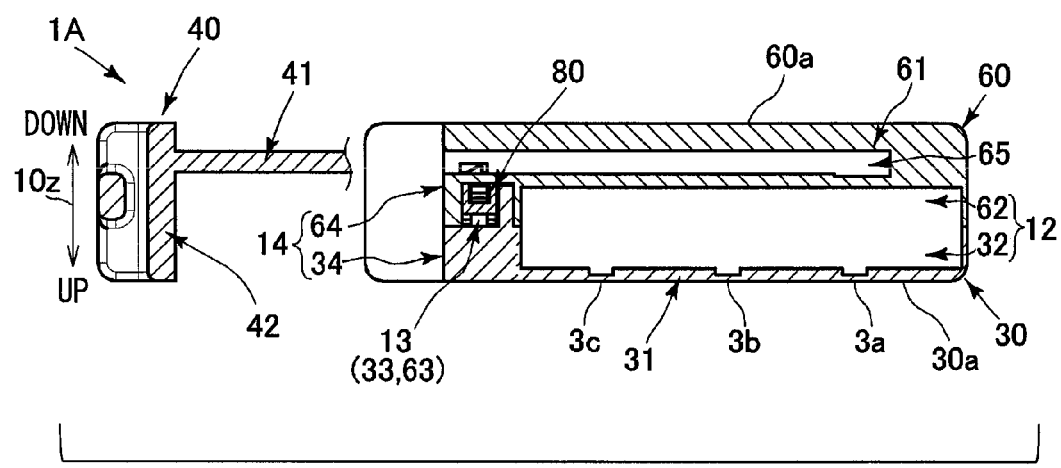
FIG. 7A is a cross-sectional view taken along a line VIIA-VIIA in FIG. 6.
Figure 7B:
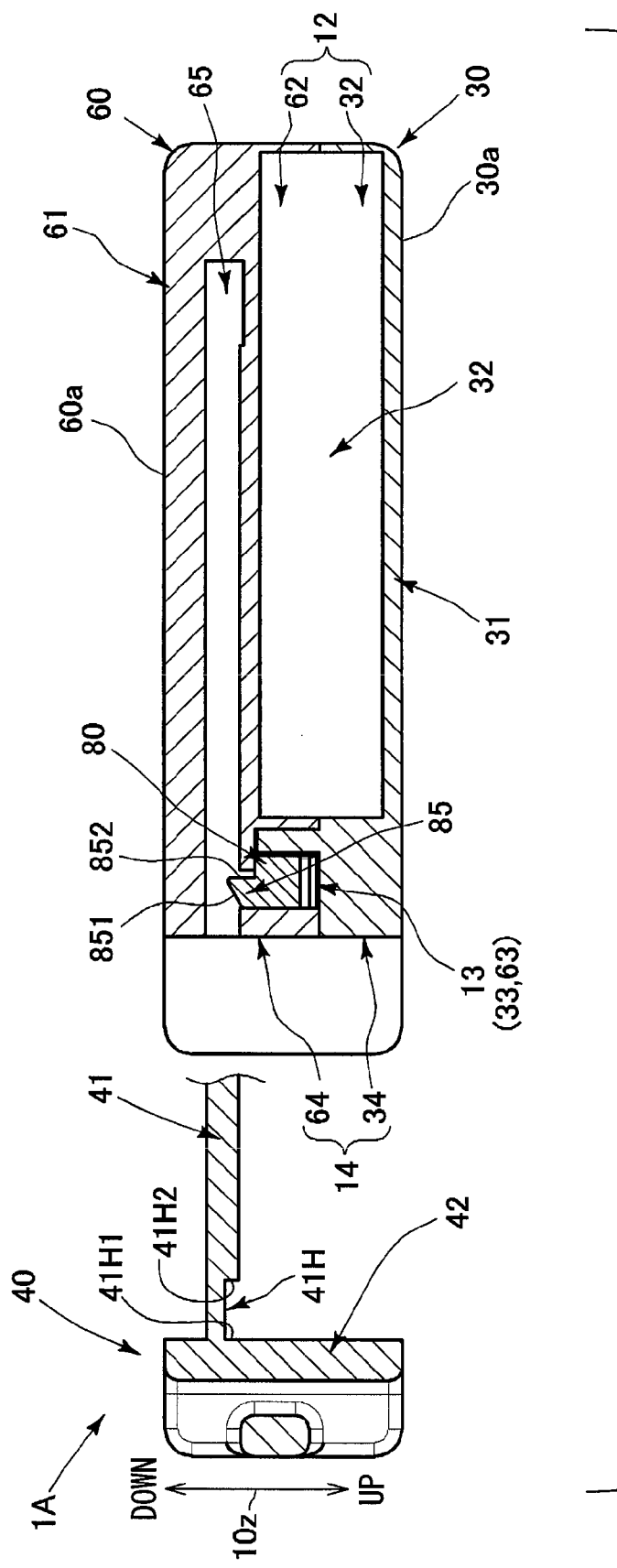
FIG. 7B is a cross-sectional view taken along a line VIIB-VIIB in FIG. 6.
Figure 7C:
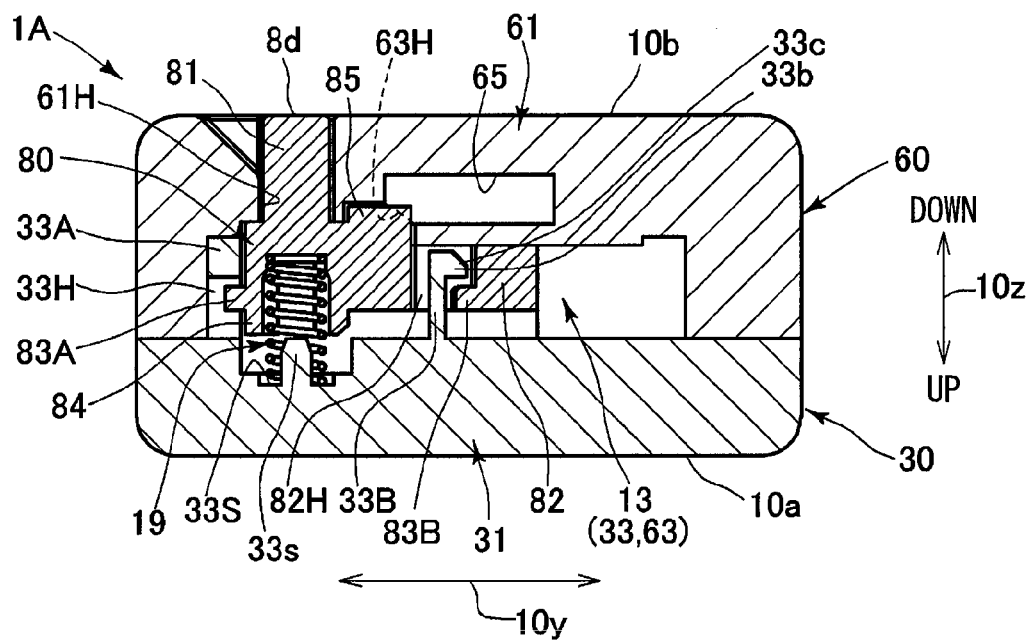
FIG. 7C is a cross-sectional view taken along a line VIIC-VIIC in FIG. 6.
Figure 17A:
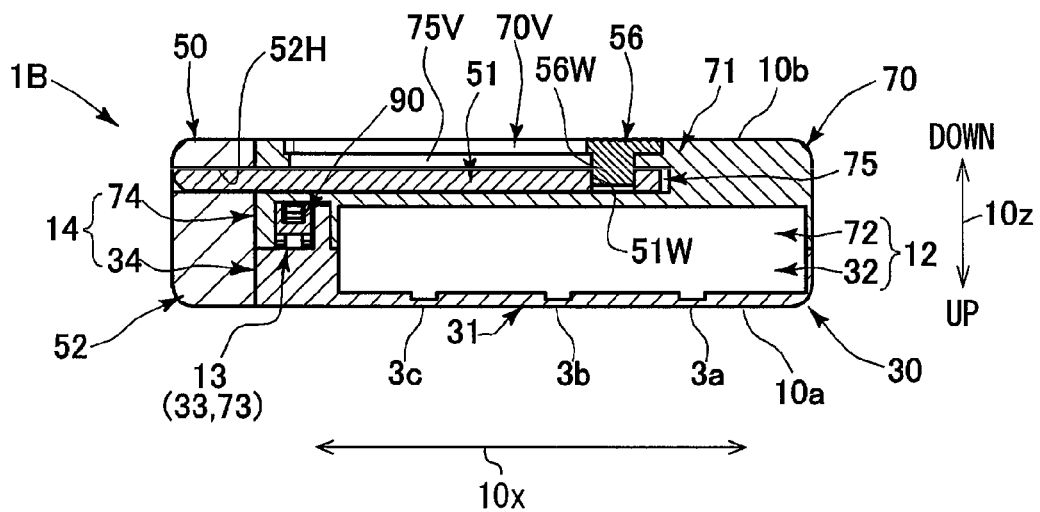
FIG. 17A is a cross-sectional view taken along a line XVIIA-XVIIA in FIG. 16.
Figure 17B:
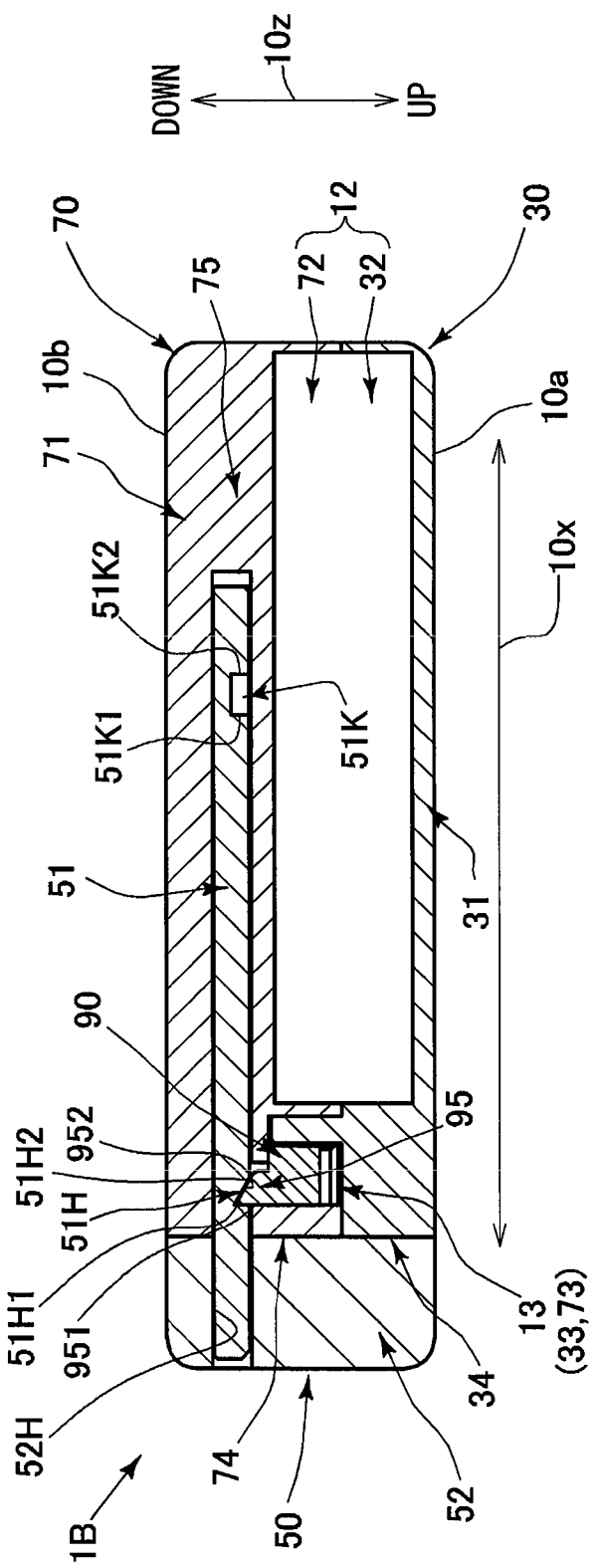
FIG. 17B is a cross-sectional view taken along a line XVIIB-XVIIB in FIG. 16.
Figure 17C:
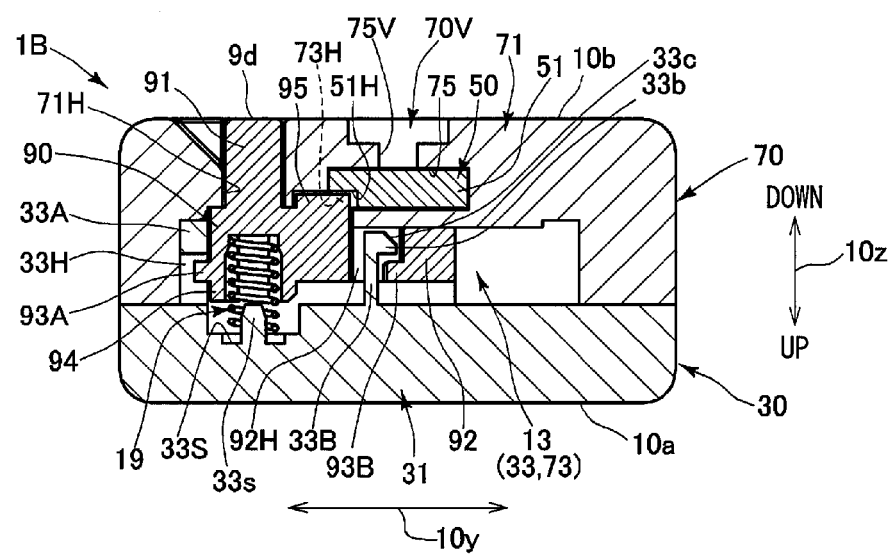
FIG. 17C is a cross-sectional view taken along a line XVIIC-XVIIC in FIG. 16.
Figure 18:
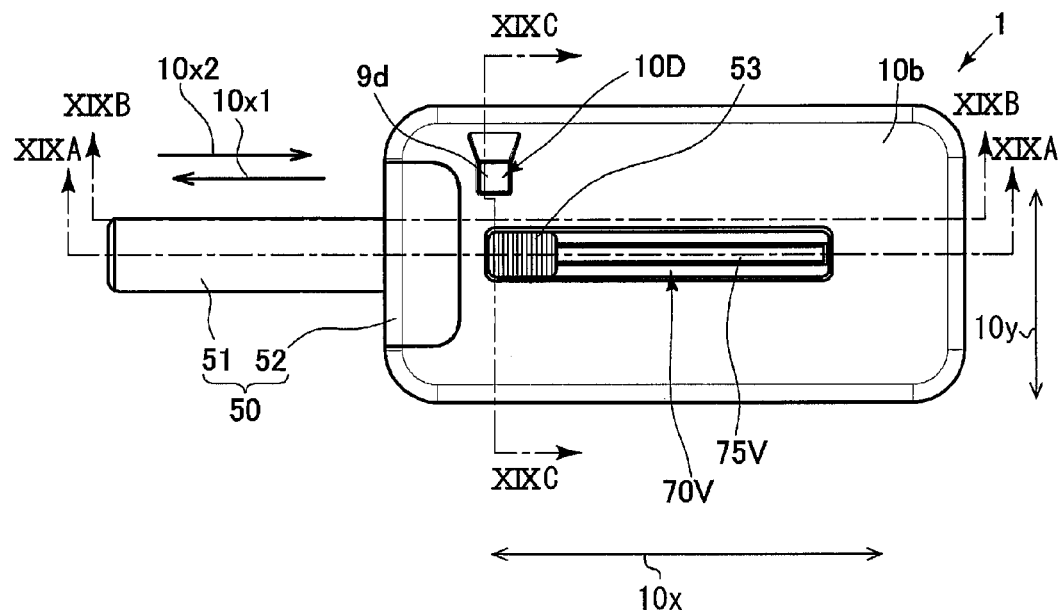
FIG. 18 is a bottom view showing a state in which the mechanical key of the vehicle electronic key in FIG. 13 is taken out.

As shown in FIGS. 5C and 17C, the switching operation components 80 and 90 have operation shaft portions 81, 91, urging member accommodation portions 84, 94, and laterally extending portions 82, 92, respectively. The operation shaft portions 81 and 91 expose distal ends (lower ends) of the operation surfaces 8d and 9d from the second main surface 10b of the lower surface portions 61 and 71, respectively. The urging member accommodation portions 84 and 94 accommodate an urging member 19 (spring member in this case) for exerting an urging force in the vertical direction 10z immediately above the operation shaft portions 81 and 91, respectively. The laterally extending portions 82 and 92 extend in an orthogonal direction 10y orthogonal to the vertical direction 10z from the urging member accommodation portions 84 and 94 (in this example, a short side direction of the first and second main surfaces 10a and 10b: hereinafter referred to as lateral width direction 10y). Further, the switching operation components 80 and 90 include engagement portions 83A, 83B, 93A, and 93B that are engaged with the upper case component 30 to be assembled, and movement restriction portions 85 and 95 that restrict the movement of the mechanical keys 40 and 50 accommodated in the key accommodation portions 65 and 75 of the lower case components 60 and 70, respectively. The movement restriction portions 85 and 95 according to the present embodiment are formed in the laterally extending portions 82 and 92, respectively.

The operation portion 10D already described includes the switching operation components 80, 90 and the urging member (spring member) 19 which is the common component 15.

Figure 11:
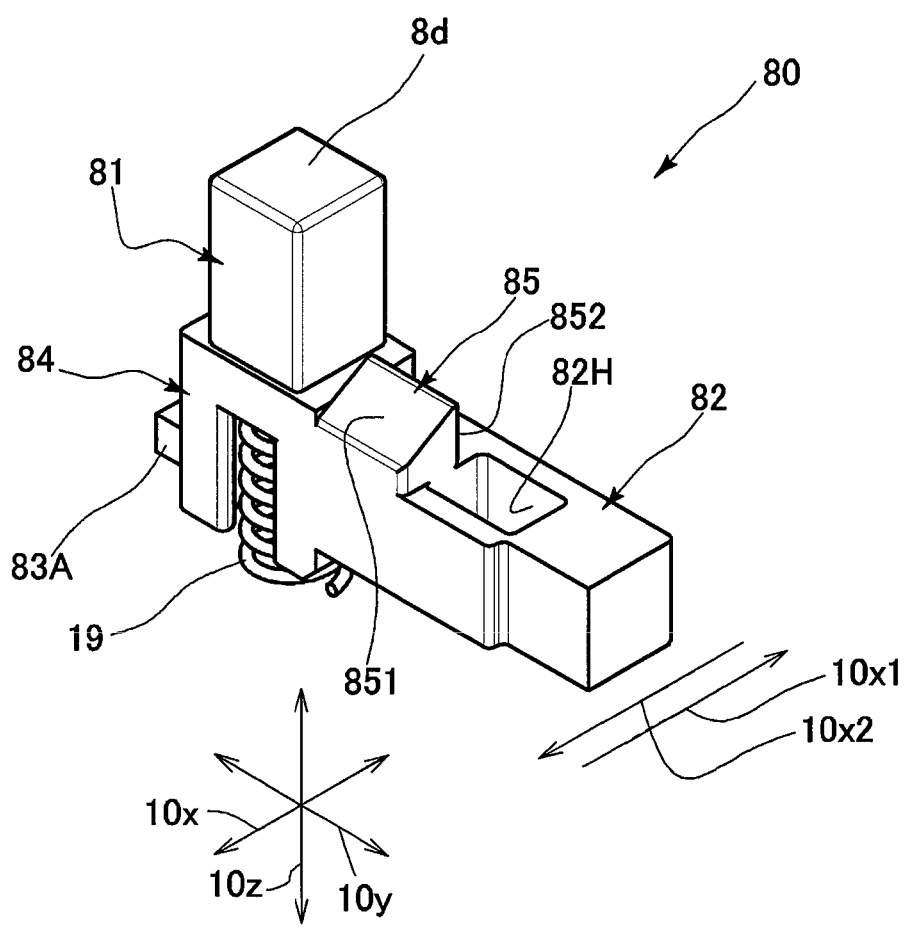
FIG. 11 is a perspective view showing a switching operation component of the vehicle electronic key in FIG. 1.
Figure 12A:
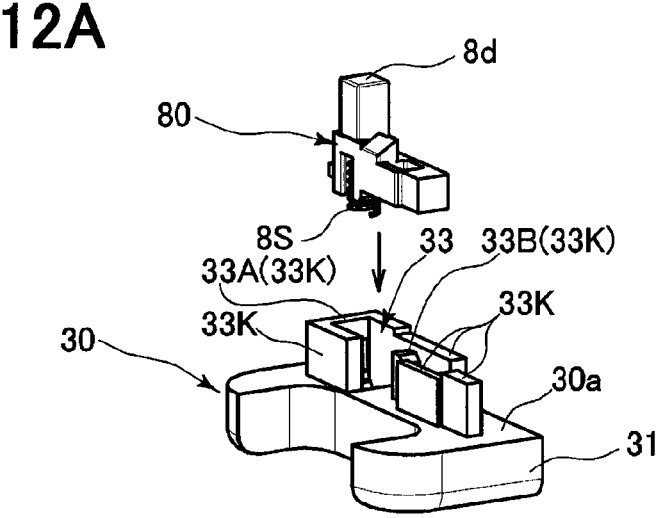
FIG. 12A is a first view showing assembly and accommodation of the switching operation components of the vehicle electronic key in FIG. 1.
Figure 12B:
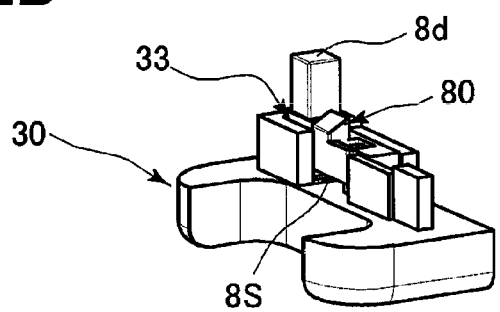
FIG. 12B is a second view showing assembly and accommodation of the switching operation components of the vehicle electronic key in FIG. 1.
Figure 12C:
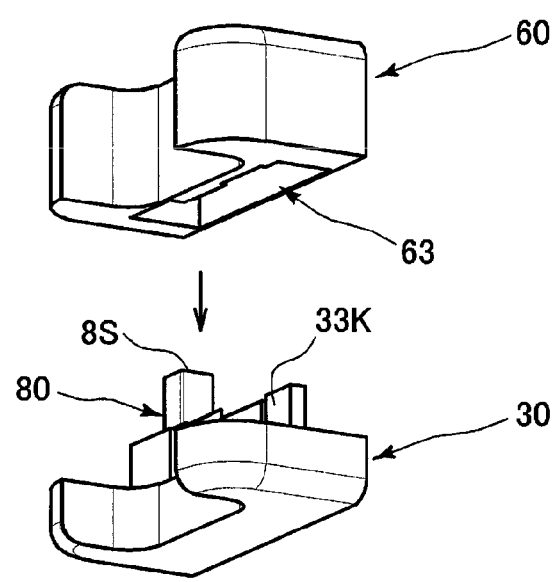
FIG. 12C is a third view showing assembly and accommodation of the switching operation components of the vehicle electronic key in FIG. 1.
Figure 22:
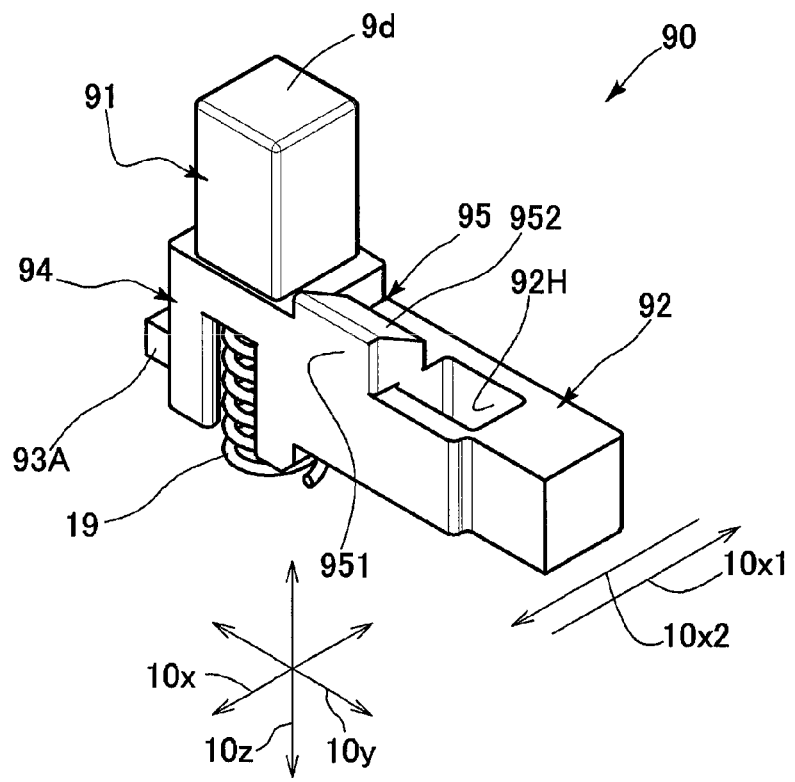
FIG. 22 is a perspective view showing a switching operation component of the vehicle electronic key in FIG. 13.

As shown in FIGS. 11 and 22, both of the switching operation components 80 and 90, which are the selective components 16, are formed in the same shape except that inclined surfaces 851 and 952 of the distal ends of the engagement protrusion portions 85 and 95 forming the movement restriction portions 85 and 95 are different in inclination direction from each other, that is, one inclined surface faces in the takeout direction 10x1 while another inclined surface faces in the insertion direction 10x2. For that reason, both the first and second lower case components 60 and 70 are capable of accommodating the switching operation components 80 and 90 in the component accommodation portions 63 and 73, respectively.

As shown in FIG. 5C and FIG. 17C, the switching operation components 80 and 90 are engaged with and attached to the component accommodation portion 33 of the upper case component 30. The engagement portions 83A, 83B, 93A, and 93B of the switching operation components 80 and 90 are engaged with the engagement portions 33A and 33B formed in the component accommodation portion 33 of the upper case component 30, to thereby put in a state where the upper case component 30 is engaged with and attached to the component accommodation portion 33. The switching operation components 80 and 90 according to the present embodiment are provided with the engagement protrusion portions 83A and 93A that protrude toward the first side on the first side in the lateral width direction 10y, and the engagement protrusion portions 83B and 93B that protrude toward the first side from inner wall surfaces on the second side inside of the through holes 82H and 92H that penetrate through the laterally extending portions 82 and 92 in the vertical direction 10z on the second side opposite to the first side. On the other hand, as shown in FIG. 10A, the component accommodation portion 33 of the upper case component 30 according to the present embodiment includes the engagement wall portion 33A having the through hole 33H that penetrates through the wall portion 33K in the lateral width direction 10y on the first side in the lateral width direction 10y (refer to FIGS. 5C and 17C), and the engagement wall portion 33B having an engagement claw portion 33b that protrudes downward from the rear surface 30a of the upper surface portion 31 on the second side in the lateral width direction 10y, and protrudes toward the second side in the lateral width direction 10y on the distal end. The engagement wall portion 33B is configured as an elastic portion that is elastically deformable to swing the distal end side of the engagement wall portion 33B in the lateral width direction 10y.

Meanwhile, FIG. 10A and FIGS. 10C and 12A to 12C are diagrams showing the first side of the first vehicle electronic key 1A in the longitudinal direction 10x. As compared to the same place of the second vehicle electronic key 1B, as already described, the difference resides in only the shape of distal end surfaces 851 and 952 of the engagement protrusion portions 85 and 95 in the first and second switching operation components 80 and 90. Therefore, as with the case of the first vehicle electronic key 1A, the second switching operation component 90 is accommodated in the component accommodation portion 33 of the upper case component 30 and the component accommodation portion 73 of the second lower case component 70.

Now, a procedure of engaging and assembling the switching operation components 80 and 90 with the component accommodation portion 33 of the upper case component 30 according to the present embodiment will be described.

First, the urging member 19 is accommodated in the urging member accommodation portions 84 and 94 of the switching operation components 80 and 90 (refer to FIGS. 11 and 22). Then, the switching operation components 80 and 90 are accommodated in the component accommodation portion 33 of the upper case component 30 (refer to FIG. 12A). Specifically, first, the engagement protrusion portions 83A and 93A of the switching operation components 80 and 90 that accommodate the urging member 19 are inserted into the through hole 33H of the engagement wall portion 33A of the upper case component 30. The engagement wall portion 33B is inserted into the through holes 82H and 92H of the laterally extending portions 82 and 92 while holding a state in which the engagement protrusion portions 83A and 93A are inserted into the through hole 33H. During this insertion, the engagement claw portion 33b of the engagement wall portion 33B abuts against the engagement protrusion portions 83B and 93B that protrude to the first side in the lateral width direction 10y within the through holes 82H and 92H, and prevents the insertion of the engagement protrusion portions 83A and 93A. However, as shown in FIGS. 5C and 17C, the engagement claw portion 33b is formed such that an abutment surface 33c that abuts against the engagement protrusion portions 83B and 93B at this time is an inclined surface having a gradient in the lateral width direction 10y. The engagement claw portion 33b side of the engagement wall portion 33B can be elastically deformed in the lateral width direction 10y as the insertion is advanced. Due to the above elastic deformation, the engagement claw portion 33b can get over the engagement protrusion portions 83B and 93B. After getting over, the engagement claw portion 33b of the engagement wall portion 33B is elastically restored to abut (engage) with the gotten-over engagement protrusion portions 83B and 93B in a direction opposite to the inserting direction, and puts into a stopped state as shown in FIGS. 5C and 17C. This state is an assembled state in which the switching operation components 80 and 90 are engaged with the upper case component 30 (refer to FIG. 12B).

Finally, the upper case component 30, to which the switching operation components 80 and 90 are attached, is attached to the lower case components 60 and 70. As a result, the switching operation components 80 and 90 attached to the upper case component 30 are entirely accommodated in the recessed component accommodation portions 63 and 73 (refer to FIG. 12C) of the lower case components 60 and 70, respectively. As a result, the accommodation space 13 (refer to FIG. 5C and FIG. 17C) that accommodates the first switching operation component 80 or the second switching operation component 90 is defined in the key case 10 by the accommodation portion 33 of the upper case component 30 and the component accommodation portions 63 and 73 of the lower case components 60 and 70.

As shown in FIGS. 5C and 17C, the accommodation space 13 communicates with the key accommodation portions 65 and 75 formed in the lower case components 60 and 70, respectively. The switching operation components 80 and 90 accommodated in the accommodation space 13 protrude the movement restriction portions 85 and 95 from the openings 63H and 73H that communicate with the key accommodation portions 65 and 75 into the lower key accommodation portions 65 and 75 on the lower side, respectively. The movement restriction portions 85 and 95 serve as the engagement protrusion portions 85 and 95 that engage with the mechanical keys 40 and 50 accommodated in the key accommodation portions 65 and 75 in such a manner as to enter the inside of the engagement recessed portions 41H and 51H and restrict the movement of the mechanical keys 40 and 50.

On the other hand, as shown in FIGS. 5C and 17C, the accommodation space 13 communicates with the outside through the through holes 61H and 71H penetrating through the lower surface portions 61 and 71 of the lower case components 60 and 70 in the vertical direction. The operation shaft portions 81 and 91 of the switching operation components 80 and 90 are placed in the through holes 61H and 71H. The distal end faces (operation surfaces) 8d and 9d of the operation shaft portions 81 and 91 are pushed in an axis line direction of the operating shaft portions 81 and 91 by a user's operation. Consequently, the whole of the switching operation components 80 and 90 is pushed in the pushed-in direction (upward) by the user's operation (refer to FIG. 8). However, the switching operation components 80 and 90 are always subjected to the urging force from the urging member (in this case, the spring member) 19 and pressed against the lower case components 60 and 70. For that reason, the user's pushing operation toward the operation surfaces 8d and 9d is performed against the urging force of the urging member 19. When the user's operation is eliminated, the switching operation components 80 and 90 attempt to return to positions before the user's operation by the urging force of the urging member 19. However, when the mechanical keys 40 and 50 move during the user's operation, there are cases where the switching operation components 80 and 90 cannot return to the position before the user's operation (refer to FIGS. 9 and 21B).

The urging member 19 is disposed between the upper case component 30 and the switching operation components 80, 90, and presses the switching operation components 80 and 90 against the lower case components 60 and 70. As shown in FIGS. 5C and 17C, the urging member 19 according to the present embodiment is accommodated in the urging member accommodation portions 84 and 94 located on the upper side of the operation shaft portions 81 and 91 in the switching operation components 80 and 90. The urging member accommodation portions 84 and 94 have an inner wall surface shape corresponding to a shape of the urging member 19, and position the disposed urging member 19. On the other hand, the component accommodation portion 33 of the upper case component 30 accommodates the urging member 19 in a recessed-shaped urging member accommodation portion 33S that is recessed upward. The urging member accommodation portion 33S has a protrusion portion 33s that protrudes downward from the center of the bottom surface of the urging member accommodation portion 33S. The urging member 19 that forms the spring member is positioned coaxially with its upper side surrounding the protrusion portion 33s and positioned.

As shown in FIGS. 5A and 5B and FIGS. 17A and 17B, the key accommodation portions 65 and 75 are formed on the lower surface portions 61 and 71 forming the bottom faces of the component accommodation portions 62, 63, 72 and 73 in the lower case components 60 and 70. The key accommodation portions 65 and 75 according to the present embodiment are sheath portions formed to extend along the longitudinal direction 10x at the center in the lateral width direction 10y of the lower surface portions 61 and 71. The key accommodation portion 65 according to the present embodiment can accommodate the first mechanical key 40 by inserting the key shaft portion 41 inside while leaving the key head portion 42 outside and can remove the accommodated first mechanical key 40 by moving the key 40 toward the key head portion 42. On the other hand, the key accommodation portion 75 according to the present embodiment inserts and accommodates the key body 51 inside by inserting the key body 51 from the opening 52H of the key passing portion 52 engaged and fixed to the key fitting portion 74. The accommodated key body 51 can be moved in the takeout direction 10x1 opposite to the insertion direction 10x2 to put in the protruding state. Similarly, the lower surface portions 61 and 71 have a thicker thickness shape in the vertical direction 10z (also referred to as the thickness direction 10z) than the upper surface portion 31 of the upper case component 30 forming the bottom surfaces of the component accommodation portions 32 and 33. The key accommodation portions 65 and 75 extend within the thick shape along the longitudinal direction 10x.

It should be noted that the key accommodation portions 65 and 75 of the first and second lower case components 60 and 70, which are the selective components 16, have openings 63H and 73H that communicate with at least the component accommodation portions 63 and 73 (accommodation space 13) at the same position and in the same shape. As a result, the mechanical keys 40 and 50 accommodated in the key accommodation portions 65 and 75 are subjected to the movement restriction from any of the switching operation components 80 and 90 accommodated in the component accommodation portions 63 and 73 (accommodation space 13). The shapes of the key accommodation portions 65 and 75 other than the openings 63H and 73H can be determined according to the shapes of the key shaft portion 41 and key body 51. However, in the present embodiment, both of the key accommodation portions 65 and 75 of the first and second lower case components 60 and 70 are formed in the same shape.

As shown in FIGS. 3 and 15, the key fitting portions 64 and 74 are formed on the first side of the lower case components 60 and 70 in the longitudinal direction 10x, and an intermediate portion in the lateral width direction 10y has a recessed shape that is recessed toward the second side (i.e. in the insertion direction 10x2) of the longitudinal direction 10x. The accommodating ports (openings) 64H and 74H of the key accommodation portions 65 and 75 are formed in the recessed bottom surfaces 64c and 74c of the key fitting portions 64 and 74, respectively.

Incidentally, in the key fitting portions 64 and 74 of the first and second lower case components 60 and 70, which are the selective components 16, the fitting surfaces 64b, 64c and the fitting surfaces 74b, 74c on the inner side of the recessed shape, which are fitted to the key head portion 42 and the key passing portion 52 of the first and second mechanical keys 40 and 50, have the same shapes as each other. On the other hand, both the key head portion 42 and the key passing portion 52 of the first and second mechanical keys 40 and 50 have an outer peripheral surface shape fitted in the recessed shape formed by the fitting surfaces 64b, 64c, 74b, and 74c of the same shape.

Also, in the first and second mechanical keys 40 and 50 which are the selective components 16 corresponding to each other, the exposed surfaces of the first and second mechanical keys 40 and 50 each have a common design (for example, silver color having a metallic texture). On the other hand, the exposed surfaces of the case parts 60 and 70 which are the corresponding selective components 16 have a common design (for example, black). Further, the exposed surface of the case part 30 which is the common component 15, has a common design (for example, black) to the exposed surfaces of the case parts 60 and 70. The designs of the first and second mechanical keys 40 and 50 (for example, silver as described above) and the case parts 30, 60, and 70 (for example, black) are designed to be different from each other. In this way, as long as the exposed surfaces of the corresponding selective components 16 (in this case, the parts 40 and 50 correspond to each other and the parts 60 and 70 correspond to each other) have common designs, the first and second vehicle electronic keys 1A and 1B have a common design property.

However, as shown in FIG. 15, the key fitting portion 74 is different from the key passing portion 64 in that the fixing portion 74A for engaging and fixing the key passing portion 52 of the mechanical key 50 is provided on the fitting surfaces 74b and 74c. The key fitting portion 74 according to the present embodiment has both-end side protrusion portions 74B and 74B that protrude in opposition to each other in the longitudinal direction 10x from both end sides of the bottom surface 74c in the recessed shape in the lateral width direction 10y toward the first side in the longitudinal direction 10x. The both-end side protrusion portions 74B and 74B have engagement recessed portions 74A forming the fixing portion 74A on opposite surfaces 74b and 74b opposed to each other in the lateral width direction 10y. On the other hand, the key passing portion 52 has engagement convex portions 52A and 52A protruding from both sides in the lateral width direction 10y. The upper end of the engagement recessed portion 74A is open, and the engagement convex portions 52A and 52A are inserted into the engagement recessed portion 74A from above, and put in an engaged state of being opposed to and abutted against both sides and a lower side in the longitudinal direction 10x. As a result, the key passing portion 52 is engaged in a state of being fitted in the key fitting portion 74. When the upper case component 30 is attached to the lower case component 70 in this engaged state, the upper portion of the engagement recessed portion 74A is covered, and the key passing portion 52 is attached to the upper case component 30 and the lower case component 70 (key case 10) to be undetachable while being fitted in the key fitting portion 74.

Figure 23:
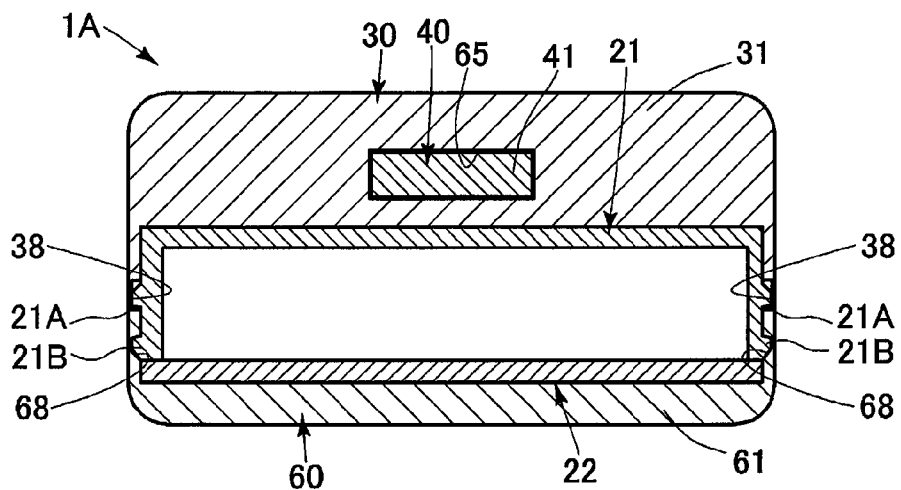
FIG. 23 is a cross-sectional view schematically showing engagement and fixation of an upper case component and a lower case component in FIG. 1 with reference to a cross-section taken along a line XXIII-XXIII in FIG. 4.

It should be noted that a combination structure of the upper case component 30 and the lower case components 60, 70 is common to the first and second vehicle electronic keys 1A and 1B. As shown in FIG. 23, the upper case component 30 and the lower case components 60, 70 according to the present embodiment are combined together by engagement via snap-fit between the engagement recessed portion 38 corresponding to the upper case component 30 and a plurality of engagement claw portions 21A formed on the outer peripheral surface of the part 21, and likewise by engagement via snap-fit between the engagement recessed portions 68 and 78 corresponding to the lower case components 60 and 70 and a plurality of engagement claw parts 21B formed on the outer peripheral surface of the part 21. Another combination structure of the upper case component 30 and the lower case components 60 and 70 may be employed as long as the combination structure is common to the first and second vehicle electronic keys 1A and 1B.

In the cross-sectional view of FIG. 23, the wireless communication function component 20 accommodated in the key case 10 is omitted, and a detailed structure of the parts 21 and 22 is also illustrated in a simplified manner with the omission of the detailed structure. Although FIG. 23 illustrates the first vehicle electronic key 1A, the same is applied to the second vehicle electronic key 1B with respect to those illustrated portions. Therefore, those portions of the second vehicle electronic key 1B will be omitted from illustration.

In this case, the movement and movement restriction of the mechanical keys 40 and 50 in the key case 10 will be described.

As shown in FIGS. 5C and 17C, the mechanical keys 40 and 50 in the state of being accommodated in the key accommodation portions 65 and 75 have the engagement recessed portions 41H and 51H that receive the engagement protrusion portions 85 and 95 protruded in the key accommodation portions 65 and 75 through the openings 63H and 73H from the accommodation space 13. The engagement recessed portions 41H and 51H according to the present embodiment receive the engagement protrusion portions 85 and 95 inward toward in a direction (in this example, the vertical direction 10z) perpendicular to the axis line direction (in this example, the longitudinal direction 10x) of the key shaft portion 41 and the key body 51. As shown in FIGS.

5B and 17B, the engagement protrusion portions 85 and 95 received in the engagement recessed portions 41H and 51H are formed such that outer surfaces 852 and 952 (refer to FIGS. 11 and 22) facing in the insertion direction 10$x$2 face and abut against inner wall surfaces 41H2 and 51H2 (refer to FIGS. 7B and 21B) positioned on halves of the engagement recessed portions 41H and 51H in the insertion direction 10$x$2. As a result, the mechanical keys 40 and 50 are prevented from moving while the mechanical keys 40 and 50 are accommodated in the key accommodation portions 65 and 75, which is a movement restriction state.

However, in the first mechanical key 40, both the outer surface 852 (refer to FIG. 11) of the engagement protrusion portion 85 facing in the insertion direction 10$x$2 and the inner wall surface 41H2 (refer to FIG. 7B) positioned on the half of the engagement recessed portion 41H in the insertion direction 10$x$2 and abutting against the outer surface 852 form orthogonal planes that are orthogonal to the takeout direction 10$x$1 and the insertion direction 10$x$2. For that reason, the movement restriction state by those surfaces 852 and 41H2 is a take-out prohibition state of prohibiting the movement of the first mechanical key 40 in the takeout direction 10$x$1.

On the other hand, in the second mechanical key 50, the outer surface 952 (refer to FIG. 21B) of the half of the engagement protrusion portion 95 facing in the insertion direction 10$x$2 and the inner wall surface 51H2 (refer to FIG. 21B) positioned on the half of the engagement recessed portion 51H in the insertion direction 10$x$2 and abutting against the outer surface 952 are formed as inclined surfaces where one or both of those surfaces 952 and 51H2 declines in the takeout direction 10$x$1. In this example, both the surface 952 and the surface 51H2 form the inclined surface. For that reason, when an additional force is applied to the second mechanical key 50 in the takeout direction 10$x$1, the engagement protrusion portion 95 abuts and presses against the inner wall surface 51H2 forming the inclined surface of the engagement recessed portion 51H and pushes the entire switching operation component 90 upward. As a result, the engagement protrusion portion 95 retreats from the engagement recessed portion 51H into the accommodation space 13, and is disengaged. As a result, there is no object in a space away from the inner wall surface 51H2 in the takeout direction 10$x$1 to face and abut against the inner wall surface 51H2 which is positioned on the half of the engagement recessed portion 51H in the insertion direction 10$x$2, and thereby the second mechanical key 50 can be taken out. In other words, the movement restriction state by the surfaces 952 and 51H2 is a takeout preventing state in which the movement of the second mechanical key 50 is prevented in the takeout direction 10$x$1, but the movement in the takeout direction 10$x$1 is not prohibited but permitted.

Incidentally, the switching operation components 80 and 90 are subjected to the urging force of the urging member 19. The engagement protrusion portions 85 and 95 are constantly pressed into the engagement recessed portions 41H and 51H by the urging force and are held in a state of being received in the engagement recessed portions 41H and 51H.

However, when the operation portion 10D (refer to FIGS. 2 and 14A) is operated by a user's operation, the entire switching operation components 80 and 90 are pushed upward (pushing direction). The user's operation to the operation portion 10D is an operation of pushing the switching operation components 80 and 90 into the operation surfaces 8$d$ and 9$d$. As shown in FIGS. 5C and 17C, there is a gap between the switching operation components 80, 90 and the upper case component 30 so that the switching operation components 80 and 90 at this time can be moved. The switching operation components 80 and 90 are pushed out in such a manner as to enter the gap. As a result, the engagement protrusion portions 85 and 95 received in the engagement recessed portions 41H and 51H are retracted from the inside of the engagement recessed portions 41H and 51H into the accommodation space 13, and disengaged. As a result, there is no object in a space away from the inner wall surfaces 41H2 and 51H2 in the takeout direction 10$x$1 to face and abut with the inner wall surfaces 41H2 and 51H2 which are positioned on the halves of the engagement concave portions 41H and 51H in the insertion direction 10$x$2. In other words, when the operation portion 10D is operated by the user's operation, the mechanical keys 40 and 50 are released from obstructing the movement by the engagement protrusion portions 85 and 95 and can move in the takeout direction 10$x$1.

When the user's operation on the operation portion 10D (operation surfaces 8$d$ and 9$d$) is canceled, the switching operation components 80 and 90 try to again move the engagement protrusion portions 85 and 95 from the urging member 19 into the key accommodation portions 65 and 75 of the mechanical keys 40 and 50 due to the urging force. This operation is continued even after the mechanical keys 40 and 50 have moved in the takeout direction 10$x$1, but the key accommodation portions 65 and 75 at this time are filled with the key shaft portion 41 or the key body 51 of the mechanical keys 40 and 50, and there is no receiving space such as the engagement recessed portion 41H. Therefore, the engagement protrusion portions 85 and 95 abut against the key shaft 41 or the key body 51. Therefore, the movement of the mechanical keys 40 and 50 at this time is performed in such a manner that the engagement protrusion portions 85 and 95 slide on the key shaft portion 41 or the key body 51.

When the key shaft portion 41 accommodated in the key accommodation portion 65 is taken out in the takeout direction 10$x$1, the entire first mechanical key 40 is detached from the key case 10. The detached state is a usage state (refer to FIG. 2) of the first mechanical key 40 that can be used by being inserted into the keyhole. The first mechanical key 40 in the disengaged state can be again accommodated in the key case 10 in such a manner that the key shaft portion 41 is inserted into the key accommodation portion 65 from the key insertion port 64H formed in the bottom surface 64$c$ of the recessed key fitting portion 64 in the first lower case component 60.

In the disengaged state of the first mechanical key 40, the engagement protrusion portion 85 is held in a state of protruding into the key accommodation portion 65 upon receiving an urging force from the urging member 19. For that reason, the movement of accommodating the key shaft portion 41 of the first mechanical key 40 in the disengaged state in the key accommodation portion 65 is prevented by the engagement protrusion portion 85 in the key accommodation portion 65. However, the outer surface 851 of the engagement protrusion portion 85 which abuts against the key shaft portion 41 facing in the takeout direction 10$x$1 is inclined with an inclined surface 851 (refer to FIG. 11) that declines in the insertion direction 10$x$2 of the first mechanical key 40. Therefore, the key shaft portion 41 of the first mechanical key 40 abuts against the inclined surface 851 when the key shaft portion 41 is accommodated in the key accommodation portion 65. When the first mechanical key 40 is further pushed in the insertion direction 10$x$2, the key shaft portion 41 presses the inclined surface 851 and extrudes the overall switching operation component 80 upward against the urging force of the urging member 19. As a result, the engagement protrusion portion 85 retracts from the engagement recessed portion 41H into the accommodation space 13 and is disengaged. As a result, there is no object facing in the insertion direction 10x2 and abutting with the inner wall surface 51H1 of the engagement recessed portion 51H facing in the takeout direction 10x1, and the movement in the insertion direction 10x2 is enabled. In other words, the key shaft portion 41 of the first mechanical key 40 can be accommodated further inward in the key accommodation portion 65.

As described above, the first mechanical key 40 according to the present embodiment is configured such that the operation portion 10D may be operated only when the first mechanical key 40 is removed from the key case 10, and the first mechanical key 40 can be accommodated in the key case 10 without performing any special operation at the time of accommodation, and can be set in the movement restriction state (movement prohibited state) in which the first mechanical key 40 is prevented from coming off. It is needless to say that at the time of accommodation, the operating portion 10D may be operated, the engagement protrusion portion 85 of the switching operation component 80 may be intentionally pushed back into the accommodation space 13, and the key shaft portion 41 of the mechanical key 40 may be accommodated in the key accommodation portion 65.

As shown in FIG. 3, the first mechanical key 40 according to the present embodiment has the engagement recessed portion 41H only on a base end side (adjacent to the key head portion 42) of the key shaft portion 41. When the position of the engagement recessed portion 41H reaches a position of the engagement protrusion portion 85 when the key shaft portion 41 is inserted into the key accommodation portion 65 and accommodated in the insertion direction 10x2, the engagement protrusion portion 85 enters the engagement recessed portion 41H, and the first mechanical key 40 again becomes in the movement restriction state (movement prohibited state) of FIG. 5C described above.

When the first mechanical key 40 reaches the movement restriction state, the key head portion 42 of the first mechanical key 40 is fitted into the recessed key fitting portion 14 (34, 64) formed by the upper case component 30 and the first lower case component 60. The first mechanical key 40 in this fitted state has an overall rectangular parallelepiped shape (refer to FIG. 1) whose corners are chamfered.

Incidentally, as shown in FIG. 3, the key head portion 42 of the first mechanical key 40 according to the present embodiment includes a U-shaped main wall portion 42a that is formed along the inner wall surfaces 34c and 64c so as to cover the inner wall surfaces 34c and 64c inside the recessed key fitting portions 34 and 64, and a linear handle portion 42b that crosses both ends of the main wall portion 42a.

Figure 19B:
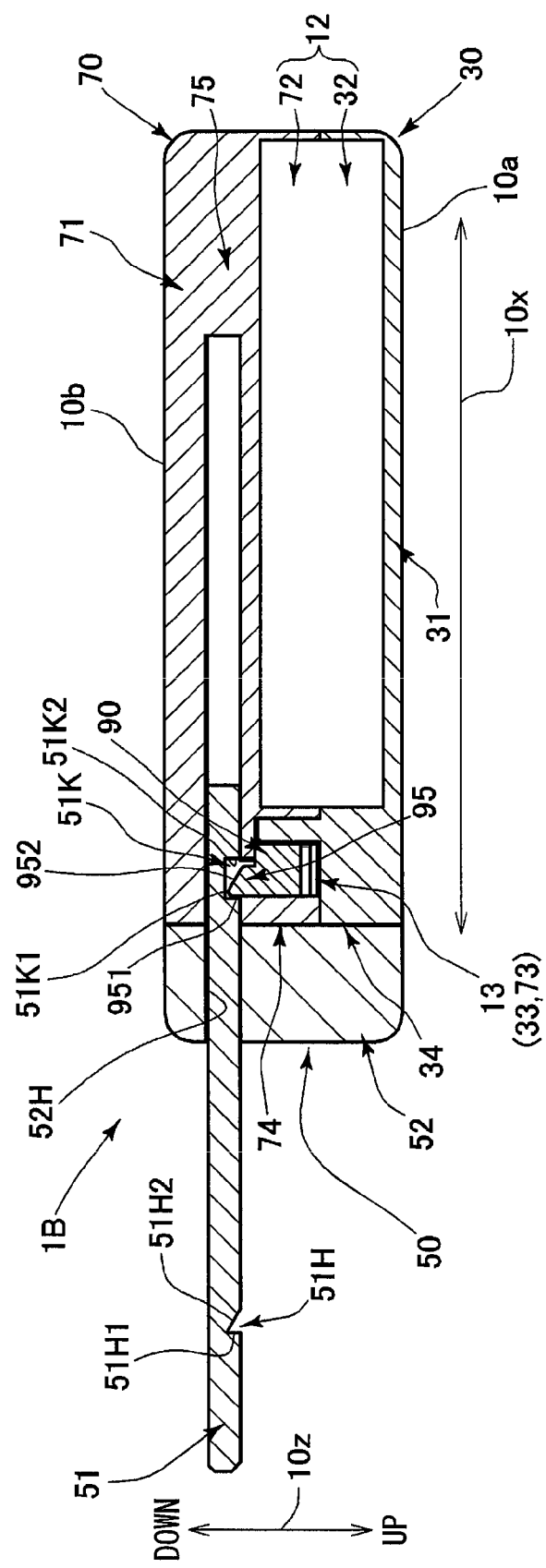
FIG. 19B is a cross-sectional view taken along a line XIXB-XIXB in FIG. 18.
Figure 19C:
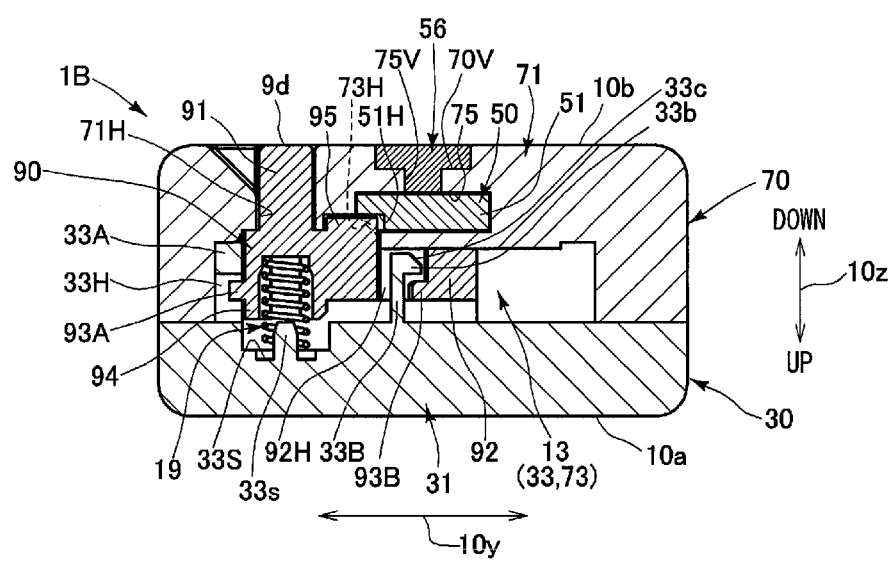
FIG. 19C is a cross-sectional view taken along a line XIXC-XIXC in FIG. 18.
Figure 20:
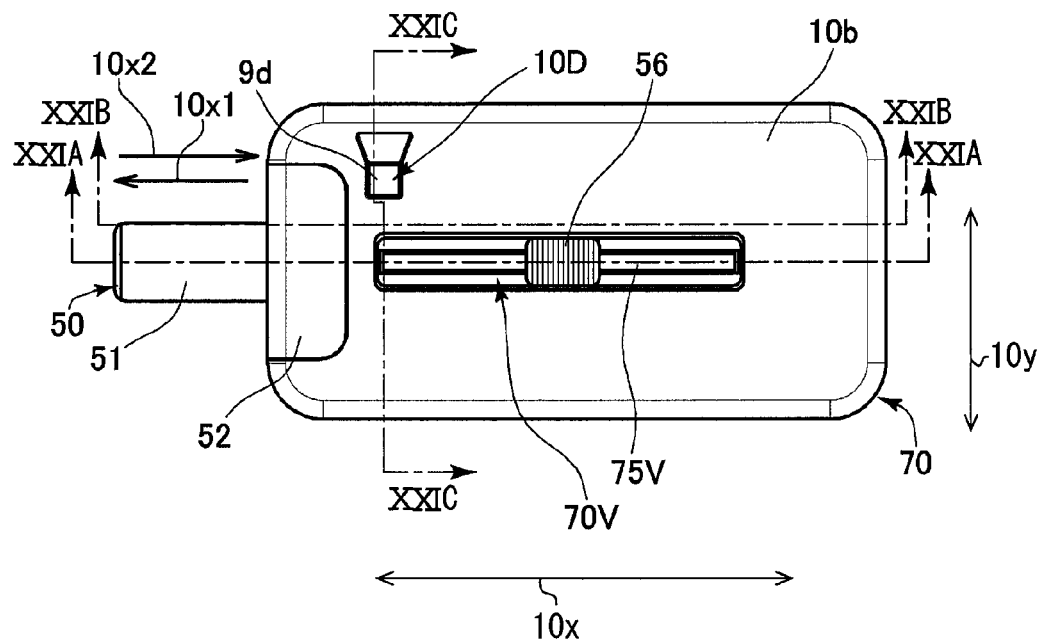
FIG. 20 is a bottom view showing a moving state of the mechanical key of the vehicle electronic key in FIG. 13.

On the other hand, as shown in FIG. 19B, when the key body 51 accommodated in the key accommodation portion 75 is taken out in the takeout direction 10x1, the movement of the second mechanical key 50 is again restricted in both the takeout direction 10x1 and the insertion direction 10x2 at a stage of being taken out by a predetermined length. That is, the second mechanical key 50 has an engagement recessed portion 51H provided on the key body 51 in an end part in the takeout direction 10x1 and an engagement recessed portion 51K oppositely provided in another end part in the insertion direction 10x2. In the second mechanical key 50, the movement restriction state (movement prohibited state) by the engagement recessed portion 51H and the engagement protrusion portion 95 on the takeout direction 10x1 side is released, and if the operation of further moving the key body 51 in the takeout direction 10x1 is performed, when the engagement recessed portion 51K on the insertion direction 10x2 side reaches the position of the engagement protrusion portion 95 this time, the switching operation component 90 is received in the engagement recessed portion 51K into the movement restriction state of FIG. 19B.

In the movement restriction state, in the engagement protrusion portion 95 received in the engagement recessed portion 51K, the outer surface 951 (refer to FIG. 22) on the takeout direction 10x1 side faces and abuts against the inner wall surface 51K1 (refer to FIG. 17B) of the engagement recessed portion 51K in the takeout direction 10x1 side. As a result, the second mechanical key 50 is prevented from moving in the insertion direction 10x2 of the key body 51. In the second mechanical key 50, both the outer surface 851 of the engagement protrusion portion 85 facing in the takeout direction 10x1 and the inner wall surface 51K1 positioned on the half of the engagement recessed portion 51K in the takeout direction 10x1 to face and abut against the outer surface 851 form orthogonal planes that are orthogonal to the takeout direction 10x1 and the insertion direction 10x2. For that reason, the movement restriction state by those surfaces 851 and 51K1 is an accommodation prohibition state of prohibiting the movement of the first mechanical key 40 in the insertion direction 10x2.

In the movement restriction state (accommodation prohibited state), the key body 51 becomes in a protruding state of being protruded outward from the key passing portion 52. The protruding state is a usage state of the second mechanical key 50 that can be used by being inserted into the keyhole. Since the movement of the key body 51 in the insertion direction 10x2 is prohibited, the key body 51 is not easily retracted in the insertion direction 10x2 at the time of use.

Figure 14B:
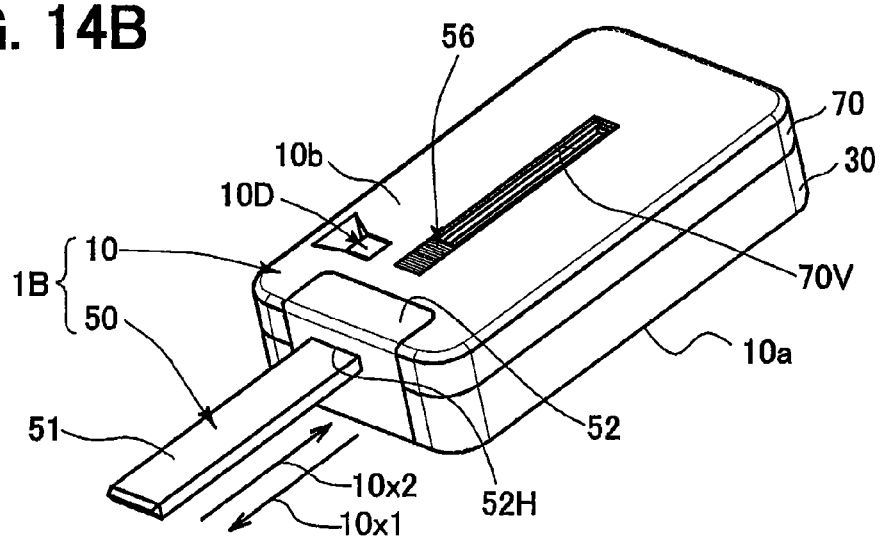
FIG. 14B is a perspective view showing a state in which the mechanical key of the vehicle electronic key in FIG. 13 is taken out.

Further, the second mechanical key 50 has an operation knob (operation portion) 56 for operating to move the key body 51 in the takeout direction 10x1 and insertion direction 10x2 (refer to FIGS. 14A and 14B). The operation knob 56 is configured for moving the key body 51 in the takeout direction 10x1 and the insertion direction 10x2, and is disposed on a guide rail 70V formed on the main surface 10b of the second lower case component 70. The guide rail 70V is formed as a guide groove for sliding the operation knob 56 in the takeout direction 10x1 and the insertion direction 10x2, and the operation knob 56 can be moved within a formation area of the guide groove.

Figure 16:
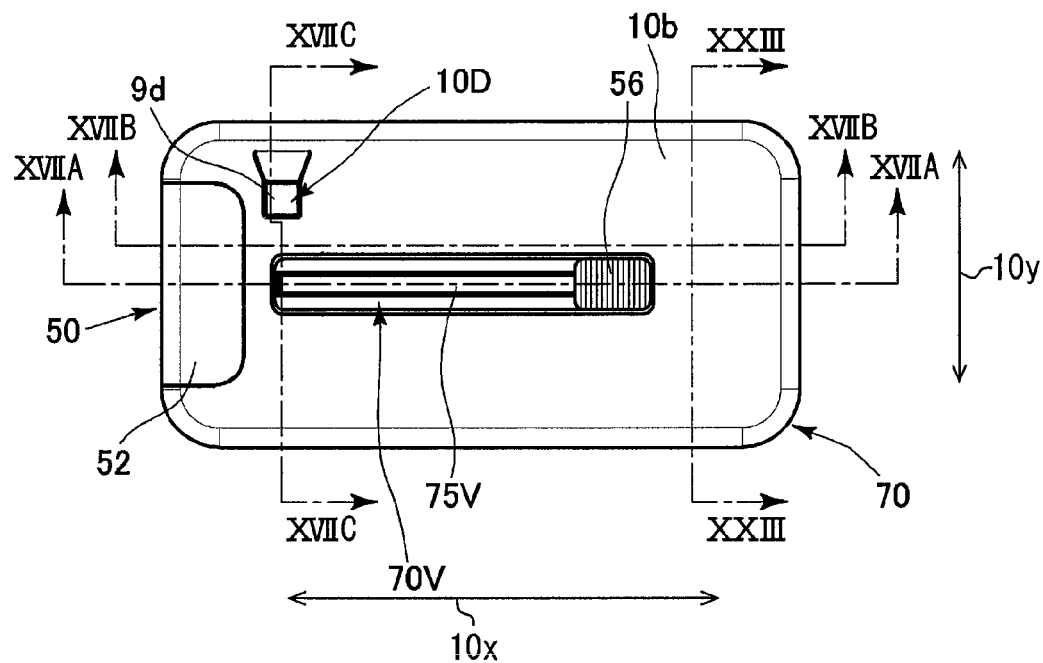
FIG. 16 is a bottom view showing the accommodated state of the mechanical key of the vehicle electronic key in FIG. 13.

As shown in FIGS. 16 and 17A, the guide rail 70V according to the present embodiment has a rail hole 75V penetrating into the key accommodation portion 75 along its own axis line direction (in this example, longitudinal direction 10x). The operation knob 56 is fitted on the guide rail 70V and causes a protrusion 56W to protrude from the rail hole 75V into the key accommodation portion 75. As shown in FIG. 19A, a protruding tip of the protrusion 56W is pressed and fixed into an assembly hole 51W of the key body 51, or is fixed by one-way fitting. As a result, the operation knob 56 is integrally combined with the key body 51. The operation knob 56 and the key body 51 integrally move along the guide rail 70V within the formation area of the guide rail 70V.

In the movement restriction state (accommodation prohibited state) of the second mechanical key 50 in which the engagement protrusion portion 95 has entered into the engagement recessed portion 51K positioned in the end part in the insertion direction 10x2, the operation knob 56 is located at an end portion of the formation area of the guide rail 70V in the takeout direction 10x1. As a result, the second mechanical key 50 in this state is put in the movement restriction state (takeout prohibited state) in which the movement toward the takeout direction 10x1 is restricted by the operation knob 56 and the guide rail 70V.

Meanwhile, in the second mechanical key 50, in the protruding state where the key body 51 protrudes to the outside, the movement restriction state in the takeout direction 10x1 and the insertion direction 10x2 (the accommodation prohibited state and the takeout prohibited state) is set on. However, the operation portion 10D is operated, thereby being capable of releasing the movement restriction state (accommodation prohibited state) in the insertion direction 10x2. When the operation portion 10D is operated, the engagement protrusion portion 95 retreats from the engagement recessed portion 51K into the accommodation space 13, and is disengaged. As a result, there is no object in a space away from the inner wall surface 51K1 in the insertion direction 10x2 to face and abut against the inner wall surface 51K1 which is positioned in the half of the engagement recessed portion 51K in the takeout direction 10x1, and thereby the key body 51 can move in the insertion direction 10x2. When the operation knob 56 is operated to further insert the key body 51, the operation knob 56 reaches the end portion of the formation area of the guide rail 70V in the insertion direction 10x2. At this time, the second mechanical key 50 is put in the above-described movement restriction state (takeout preventing state) in which the engagement protrusion portion 95 is received in the engagement recessed portion 51H which is located in the end part of the key body 51 in the insertion direction 10x2.

The key passing portion 52 of the second mechanical key 50 is fitted into the recessed key fitting portion 14 (34, 74) formed by the upper case component 30 and the second lower case component 70. The second mechanical key 50 in this fitted state has an overall rectangular parallelepiped shape (refer to FIG. 14A) whose corners are chamfered.

As shown in FIG. 13, the key passing portion 52 of the second mechanical key 50 according to the second embodiment is formed so as to fill the inside of the recessed key fitting portion 14 (34, 74). Further, the key passing portion 52 has a through hole 52H that penetrates in the longitudinal direction 10x and leads to the key accommodation portion 75 of the second lower case component 70.

As described above, the vehicle electronic keys 1A and 1B according to the present embodiment are configured by the common components 15 and the selective components 16, and the parts corresponding to each other among the selective components 16 have a common structure. In addition, the vehicle electronic keys 1A and 1B according to the present embodiment realize a structure having common elements in the first operation of taking out the first mechanical key 40 from the first lower case component 60 and the second operation of taking out the second mechanical key 50 from the second lower case component 70.

In other words, the vehicle electronic keys 1A and 1B according to the present embodiment realize a structure common to the operation of sliding in the corresponding lower case components 60 and 70. In addition, the vehicle electronic keys 1A and 1B according to the present embodiment realize a structure common to the first operation of taking out the first mechanical key 40 from the first lower case component 60 and the second operation of taking out the second mechanical key 50 from the second lower case component 70, which are the movement in mutually parallel planes (in the present embodiment, the movement in the common plane). In addition, the vehicle electronic keys 1A and 1B according to the present embodiment realize a structure common to the operation of taking out the first mechanical key 40 from the key case 10 and the operation of taking out the second mechanical key 50 from the key case 10, Both of which are linear movement in the same direction (takeout direction 10x1) determined in advance. As described above, in the vehicle electronic keys 1A and 1B according to the present embodiment, there is a similarity in taking out operation of both of the mechanical keys 40 and 50.

In the vehicle electronic keys 1A and 1B according to the present embodiment, the thickness from the first main surface 10a of the upper case component 30 to the second main surface 10b of the lower case components 60 and 70 is shorter than the length of each side of the main surfaces 10a and 10b, which is a thin type. In the vehicle electronic keys 1A and 1B according to the present embodiment, the wireless communication function components 20, 21 and 22 are accommodated on the upper side in the thickness direction 10z, and the corresponding mechanical keys 40 and 50 are accommodated on the lower side in the height direction. The mechanical keys 40, 50 and the other parts are divided up and down separately.

Although the embodiments according to the present disclosure have been described above, the embodiments are merely examples, and the present disclosure is not limited thereto. Variation modifications such as addition and omission can be performed based on the knowledge of one skilled in the art without departing from the spirit of the present disclosure.

Modification of the present disclosure may be described below. It should be noted that the common function portions to and the same function portions as those in the above embodiments are denoted by the same reference numerals and the like, and the detailed description thereof will be omitted. Further, the embodiments described above and a plurality of modifications described below can be implemented in combination as appropriate insofar as technical contradiction does not occur.

Figure 24:
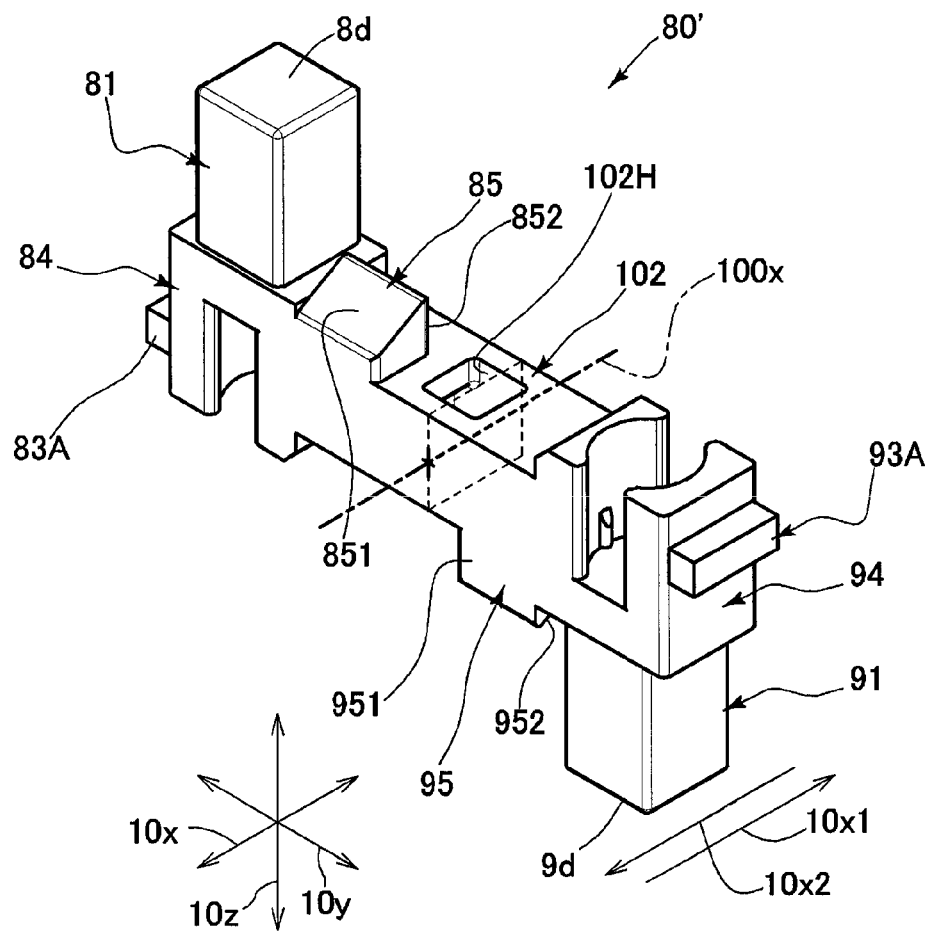
FIG. 24 is a perspective view showing a switching operation component different from that in FIGS. 1 and 13.
Figure 25A:
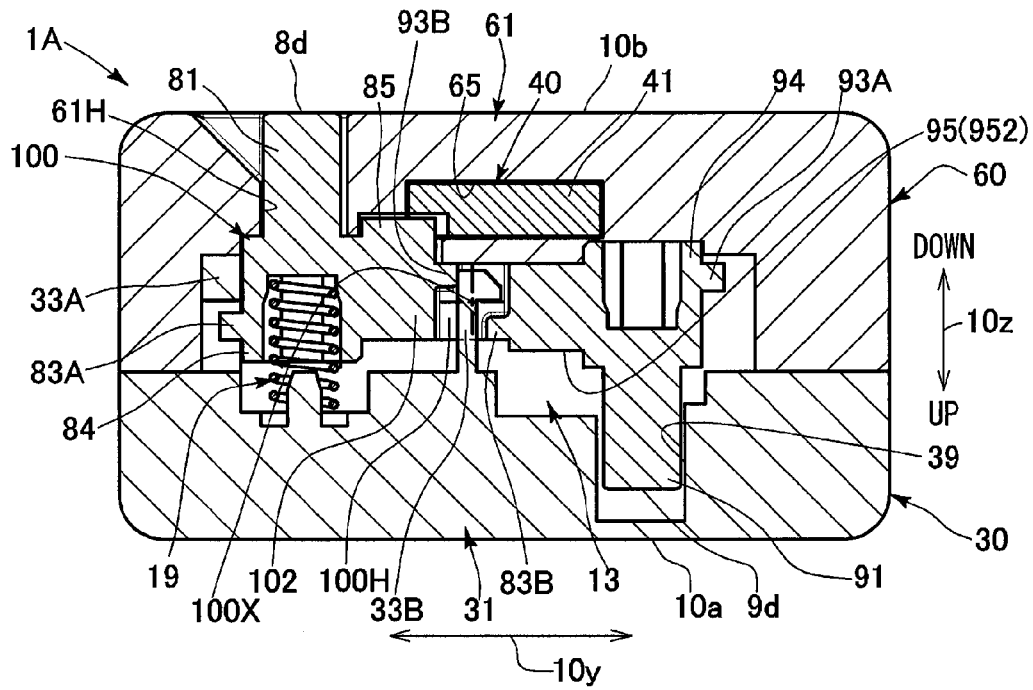
FIG. 25A is a cross-sectional view showing an accommodated state in which the switching operation component of FIG. 24 is accommodated in the upper case and a first lower case component in a section similar to a cross section taken along a line VC-VC of FIG. 4.
Figure 25B:
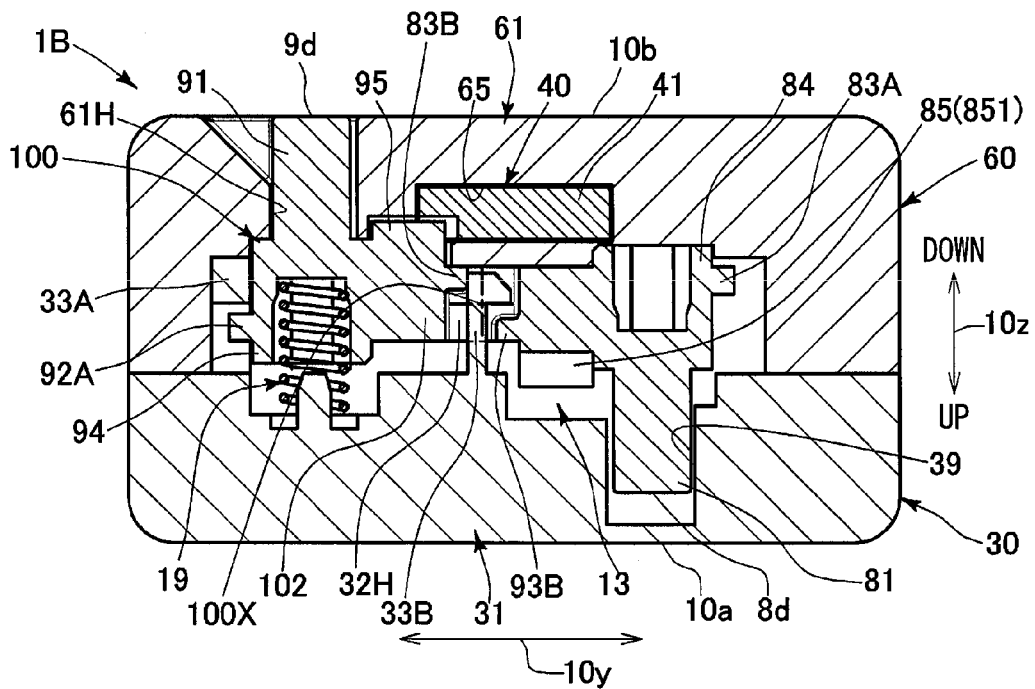
FIG. 25B is a cross-sectional view showing an accommodated state in which the switching operation component of FIG. 24 is accommodated in the upper case and a second lower case component in a section similar to a cross section taken along a line XVIIC-XVIIC of FIG. 16.

In the above embodiments, the switching operation components 80, 90 are selective components 16, but can be configured by the common components 15. In other words, as shown in FIG. 24, FIG. 25A and FIG. 25B, the switching operation component 80' that is the common component 15 can be provided by combining the switching operation components 80 and 90 described above together. More specifically, the switching operation component 80' includes the operation shaft portions 81, 91, the urging member accommodation portions 84, 94, the laterally extending portion 102 (structure corresponding to the reference numerals 82 and 92 in the embodiment already described), the engagement portions 83A, 83B, 93A, 93B, and the movement restriction portions 85, 95. However, the switching operation component 80' forms a rotationally symmetrical shape in which the first switching operation portion 80 and the second switching operation portion 90 are rotated by 180 degrees around the axis line 100x passing in the longitudinal direction to coincide with each other, at positions which are intermediate positions of the through holes 82H and 92H in the lateral width direction 10y and intermediate positions of the laterally extending portions 82 and 92 having the through holes 82H and 92H in the thickness direction 10z. The same is applied to the inside of the through hole 102H (the structure corresponding to the reference numerals 82H and 92H in the embodiment already described). The engagement protrusion portion 93B is formed on the inner wall surface on the first side in the lateral width direction 10y, and the engagement protrusion portion 83B is formed on the inner wall surface on the opposite second side. However, only the formation of the inclined faces 851, 952 and the surfaces 852, 951 in the movement restriction portions 85 and 95 are not formed in a rotationally symmetrical shape, and the inclined surfaces 851, 952, and the surfaces 852, 951 are opposite to each other in direction between the movement restriction portion 85 and the movement restriction portion 95. The upper case component 30 is formed with an accommodation portion 39 for accommodating the operation shaft portions 81 and 91 on the side not exposing the operation surfaces 8d and 9d. According to the modification, when the operation surface 8d is exposed in assembly (refer to FIG. 25A), the operation portion 10D can be used in the same way as the first vehicle electronic key 1A in the embodiment described above. When the operation surface 9d is exposed in the assembly (refer to FIG. 25B), the operation portion 10D can be used in the same manner as the second vehicle electronic key 1B of the embodiment described above.

Figure 4:
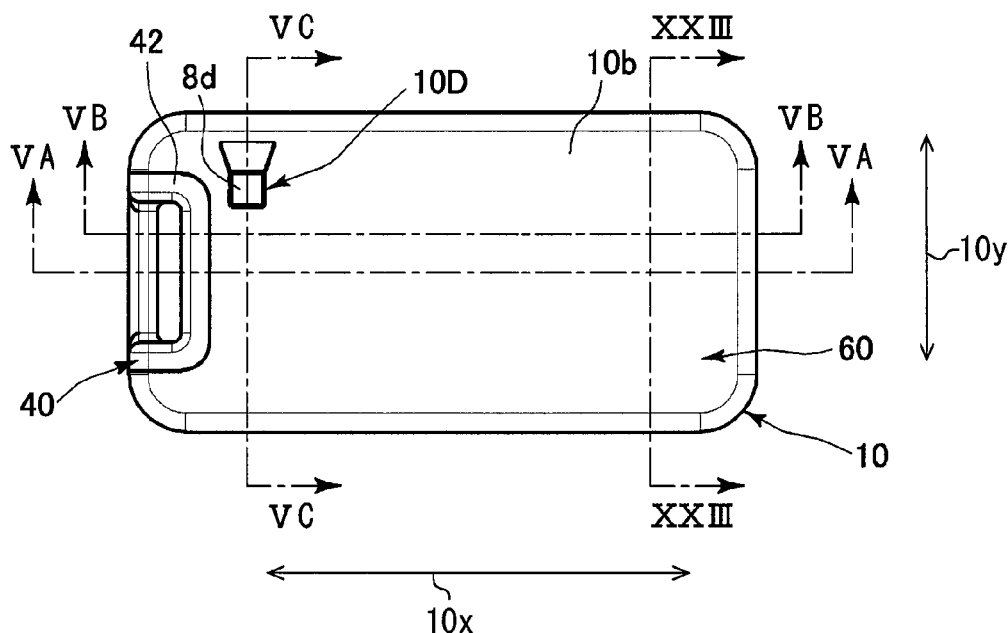
FIG. 4 is a bottom view showing an accommodated state of the mechanical key of the vehicle electronic key in FIG. 1.
Figure 26:
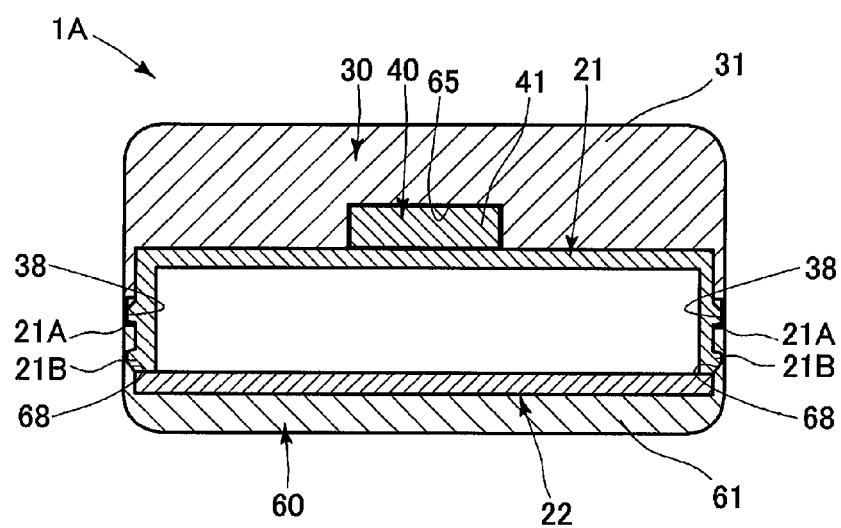
FIG. 26 is a cross-sectional view showing a modification of the vehicle electronic key according to the present disclosure, taken along a line XXIII-XXIII in FIG. 4.

In the above embodiment, the key accommodation portions 65 and 75 formed in the lower case components 60 and 70 are formed in a non-communicating relation with the component accommodation portions (communication component accommodation portions) 62 and 72. Alternatively, as illustrated in FIG. 26, the key accommodation portions 65 and 75 may communicate with each other. In that case, the wireless communication function component 21 is disposed in the component accommodation portions (communication component accommodation portions) 62 and 72 so as to cover a communicating opening (opening) of those component accommodation portions 62 and 72. According to the structure, an advantage of reducing the thickness of the key case 10 can be obtained. FIG. 26 shows a cross-section XXIII-XXIII of the first vehicle electronic key 1A in FIG. 4. A corresponding cross section of the second vehicle electronic key 1B is taken along a line XXIII-XXIII in FIG. 16. Because the cross sections XXIII-XXIII of FIGS. 4 and 16 appear similarly, the cross section taken along the line XXIII-XXIII in FIG. 16 is omitted.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle electronic key comprising:
    a wireless communication function component that is accommodated in a key case and performs a wireless communication with a corresponding vehicle;
    an upper case component that forms an upper side of the key case;
    a mechanical key that is one selected from two: a first mechanical key that is used in a state of being wholly removed from the key case; and a second mechanical key that is used in a protruding state of partially protruding from the key case; and
    a lower case component that is one selected from among a first lower case component and a second lower case component so as to correspond to the mechanical key, the first lower case component accommodating the first mechanical key to be removable from the key case, the second lower case component accommodating the second mechanical key to be movable into the protruding state, both the first lower case component and the second lower case component being attachable to the upper case component.

2. The vehicle electronic key according to claim 1, wherein
    the first mechanical key integrally includes:
        a key shaft portion having a shaft shape to be inserted into a keyhole of the vehicle; and
        a key head portion serving as a handle at the time of insertion of the key shaft portion into the keyhole, and
    the first lower case component includes a first key accommodation portion that accommodates the first mechanical key in a state where the key shaft portion is inserted into an inside of the first key accommodation portion while the key head portion is kept outside, the accommodated first mechanical key being removable from the first key accommodation portion by the key shaft portion moving in a direction toward the key head portion.

3. The vehicle electronic key according to claim 1, wherein
    the second mechanical key separately includes:
        a key body having a shaft shape to be inserted into a keyhole of the vehicle; and
        a key passing portion provided with an opening through which the key body extends to protrude into an outside, and
    the second lower case component includes:
        a fixing portion engaged with and fixing the key passing portion;
        a second key accommodation portion that accommodates the key body by insertion of the key body into an inside of the second key accommodation portion through the opening of the engaged and fixed key passing portion, the accommodated key body being movable in a direction opposite to an insertion direction to provide the protruding state;
        an operation portion that is disposed on the second lower case component and coupled to the key body for reciprocation of the key body in the insertion direction; and
        a guide rail that is formed along the insertion direction, penetrates through the second lower case component into the second key accommodation portion, and guides a reciprocating motion of the operation portion.

4. The vehicle electronic key according to claim 1, wherein
    the upper case component has a first main surface on an upper side of the key case having a rectangular-parallelepiped shape, and the first lower case component or the second lower case component has a second main surface on an opposite side of the key case from the first main surface, the key case is thin such that a thickness from the first main surface to the second main surface is shorter than a length of each side of the main surfaces, and the wireless communication function component and the corresponding mechanical key are accommodated in an upper area in a thickness direction and a lower area in the thickness direction, respectively.

5. A vehicle electronic key comprising:
    a key case that includes an upper case component and a lower case component attachable to the upper case component;

a wireless communication function component that is housed in the key case and performs a wireless communication with a corresponding vehicle; and a mechanical key that is housed in the lower case component and capable of being inserted into a keyhole of the vehicle, wherein the mechanical key is one of a first mechanical key that is to be inserted into the keyhole of the vehicle in a state of being wholly removed from the lower case component and a second mechanical key that is to be inserted into the keyhole of the vehicle in a state of partially protruding from the lower case component, and the lower case component is one of a first lower case component and a second lower case component so as to correspond to the mechanical key, the first lower case component accommodating the first mechanical key to be removable from the key case, the second lower case component accommodating the second mechanical key to be capable of partially protruding.

6. The vehicle electronic key according to claim 1, wherein the first lower case component includes a first communication component accommodation portion having a recessed shape capable of accommodating the wireless communication function component, the second lower case component includes a second communication component accommodation portion having a recessed shape capable of accommodating the wireless communication function component, and the first communication component accommodation portion has the same shape as that of the second communication component accommodation portion.

7. The vehicle electronic key according to claim 1, wherein the first lower case component includes a first key accommodation portion in which a part of the first mechanical key is capable of being inserted and accommodated, the second lower case component includes a second key accommodation portion in which a part of the second mechanical key is capable of being inserted and accommodated, and the first key accommodation portion has the same shape as that of the second key accommodation portion.

* * * * *